(12) United States Patent
Zheng et al.

(10) Patent No.: US 10,637,586 B2
(45) Date of Patent: Apr. 28, 2020

(54) TURBO RECEIVERS FOR MULTIPLE-INPUT MULTIPLE-OUTPUT UNDERWATER ACOUSTIC COMMUNICATIONS

(71) Applicants: Yahong Rosa Zheng, Rolla, MO (US); Weimin Duan, San Diego, CA (US); Chengshan Xiao, Rolla, MO (US)

(72) Inventors: Yahong Rosa Zheng, Rolla, MO (US); Weimin Duan, San Diego, CA (US); Chengshan Xiao, Rolla, MO (US)

(73) Assignee: National Science Foundation, Alexandria, VA (US)

( * ) Notice: Subject to any disclaimer, the term of this patent is extended or adjusted under 35 U.S.C. 154(b) by 333 days.

(21) Appl. No.: 15/686,390

(22) Filed: Aug. 25, 2017

(65) Prior Publication Data
US 2019/0068294 A1 Feb. 28, 2019

(51) Int. Cl.
*H04B 13/02* (2006.01)
*H04B 11/00* (2006.01)
(Continued)

(52) U.S. Cl.
CPC ............. *H04B 13/02* (2013.01); *H04B 11/00* (2013.01); *H04L 25/03057* (2013.01);
(Continued)

(58) Field of Classification Search
CPC ..... H04B 13/02; H04B 11/00; H04L 27/0008; H04L 25/03057; H04L 2025/03636; H04L 2025/03426
See application file for complete search history.

(56) References Cited

U.S. PATENT DOCUMENTS

| 3,891,960 A | 6/1975 | Widener |
| 5,301,167 A | 4/1994 | Proakis et al. |
| (Continued) | | |

FOREIGN PATENT DOCUMENTS

| CN | 203164417 U | 8/2013 |
| CN | 103491046 A | 1/2014 |
| (Continued) | | |

OTHER PUBLICATIONS

M. Stojanovic and J. Preisig, "Underwater Acoustic Communication Channels: Propagation Models and Statistical Characterization," IEEE Commun. Mag., vol. 47, No. 1, pp. 84-89, Jan. 2009.
(Continued)

*Primary Examiner* — Ian J Lobo
(74) *Attorney, Agent, or Firm* — Shook, Hardy & Bacon L.L.P.

(57) ABSTRACT

Systems and methods for underwater communication using a MIMO acoustic channel. An acoustic receiver may receive a signal comprising information encoded in at least one transmitted symbol. Using a two-layer iterative process, the at least one transmitted symbol is estimated. The first layer of the two-layer process uses iterative exchanges of soft-decisions between an adaptive turbo equalizer and a MAP decoder. The second layer of the two-layer process uses a data-reuse procedure that adapts an equalizer vector of both a feedforward filter and a serial interference cancellation filter of the adaptive turbo equalizer using a posteriori soft decisions of the at least one transmitted symbol. After a plurality of iterations, a hard decision of the bits encoded on the at least one transmitted symbol is output from the MAP decoder.

7 Claims, 25 Drawing Sheets

(51) Int. Cl.
*H04L 27/00* (2006.01)
*H04L 25/03* (2006.01)
(52) U.S. Cl.
CPC ............... *H04L 27/0008* (2013.01); *H04L 2025/03426* (2013.01); *H04L 2025/03636* (2013.01)

(56) References Cited

U.S. PATENT DOCUMENTS

| | | |
|---|---|---|
| 6,813,219 B1 | 11/2004 | Blackmon |
| 6,819,630 B1 | 11/2004 | Blackmon et al. |
| 7,447,117 B2 | 11/2008 | Yang |
| 7,859,944 B2 | 12/2010 | Zhou et al. |
| 8,542,724 B1 | 9/2013 | Blackmon et al. |
| 8,681,835 B2 | 3/2014 | Wang et al. |
| 8,700,976 B2 | 4/2014 | Gunnam et al. |
| 9,191,246 B2 | 11/2015 | Kanter |
| 9,210,012 B2 | 12/2015 | Pustovalov et al. |
| 2013/0208768 A1* | 8/2013 | Song ............ H04B 11/00 375/218 |

FOREIGN PATENT DOCUMENTS

| | | |
|---|---|---|
| CN | 102546486 B | 6/2014 |
| CN | 102629879 B | 7/2014 |
| CN | 103944848 A | 7/2014 |
| CN | 103095639 B | 5/2015 |
| WO | 9516312 A1 | 6/1995 |
| WO | 2007073315 A2 | 6/2007 |
| WO | 2009035752 A1 | 3/2009 |
| WO | 2010030513 A1 | 3/2010 |
| WO | 2010070350 A2 | 6/2010 |
| WO | 2011156322 A2 | 12/2011 |
| WO | 2014126630 A1 | 8/2014 |

OTHER PUBLICATIONS

T. C. Yang, "A Study of Spatial Processing Gain in Underwater Acoustic Communications," IEEE J. Ocean. Eng., vol. 32, No. 3, pp. 689-709, Jul. 2007.
R. Otnes and M. Tuchler, "Iterative Channel Estimation for Turbo Equalization of Time-Varying Frequency-Selective Channels," IEEE Trans. Wireless Commun., vol. 3, No. 6, pp. 1918-1923, Nov. 2004.
Z. Yang and Y. R. Zheng, "Iterative Channel Estimation and Turbo Equalization for Multiple-Input Multiple-Output Underwater Acoustic Communications," IEEE J. Ocean. Eng., vol. 41, No. 41, pp. 232-242, Jan. 2016.
J. Tao, Y. R. Zheng, C. Xiao, and T. Yang, "Robust MIMO Underwater Acoustic Communications Using Turbo Block Decision-Feedback Equalization," IEEE J. Ocean. Engl., vol. 35, No. 4, pp. 948-960, Oct. 2010.
A. Rafati, H. Lou, and C. Xioa, "Soft-Decision Feedback Turbo Equalization for LDPC-Coded MIMO Underwater Acoustic Communications," IEEE J. Ocean. Eng., vol. 39, No. 1, pp. 90-99, Mar. 2014.
W. Duan and Y. R. Zheng, "Bidirectionoal Soft-Decision Feedback Turbo Equalization for MIMO Systems," IEEE Trans. Veh. Technology, vol. p, No. 99, Aug. 2015.
B. Peng and H. Dong, "Application of Turbo Equalization in PPC Underwater Acoustic Communication," in Proc. MTS/IEEE Oceans Conf., San Diego, CA, Sep. 2013, pp. 1-4.
P. A. Van Walree and G. Leus, "Robust Underwater Telemetry With Adaptive Turbo Multiband Equalization," IEEE J. Ocean Eng., vol. 34, No. 4, pp. 645-655, 2009.
L. Cannelli, G. Leus, H. Dol, and P. van Walree, "Adaptive Turbo Equalization for Underwater Acoustic Communication," in Proc. MTS/IEE Oceans Conf., Bergen, Norway, pp. 1-9.
J. W. Choi, T. J. Riedl, K. Kim, A. C. Singer, and J. C. Preisig, "Adaptive Linear Turbo Equalization Over Doubly Selective Channels," IEEE J. Ocean. Eng., vol. 36, No. 4, pp. 473-489, Oct. 2011.
C. Laot, N. Beuzeulin, and A. Bourre, "Experimental Results on MMSE Turbo Equalization in Underwater Acoustic Communication Using High Order Modulation," in Proc. MTS/IEEE Ocean Conf., Seattle, WA, Sep. 2010, pp. 1-6.
C. Laot and R. L. Bidan, "Adaptive MMSE Turbo Equalization With High-Order Modulations and Spatial Diversity Applied to Underwater Acoustic Communications," in Wireless Conference 2011—Sustainable Wireless Technologies ) European Wireless), 11th European, Apr. 2011, pp. 1-6.
M. Qingwei, H. Jianguo, H. Jing, H. Chengbing, and M. Chuang, "An Improved Direct Adaptive Multichannel Turbo Equalization Scheme for Underwater Communications," in Proc. MTS/IEEE Oceans Conf., Yeosu, Korea, May 2012, pp. 1-5.
A. Yellepeddi and J. C. Preisig, "Adaptive Equalization in a Turbo Loop," IEEE Trans. Wireless Commun., vol. 14, No. 9, pp. 5111-5122, Sep. 2015.
S. Roy and J. J. Shynk, "Analysis of the Data-Reusing LMS Algorithm," in Proc. 32nd Midwest Symp. Circuits Sys., vol. 2, Aug. 1989, pp. 1127-1130.
J. Tao., "Single-Carrier Frequency-Domain Turbo Equalization With Various Soft Interference Cancellation Schemes for MIMO Systems" IEEE Trans. Commun., vol. 62, No. 9, pp. 3206-3217, Sep. 2015.
M. Tuchler, R. Koetter, and A. C. Singer, "Turbo Equalization: Principles and New Results," IEEE Trans. Commun., vol. 50, No. 5, pp. 754-767.
M. Tuchler, A. C. Singer, and R. Koetter, "Minimum Mean Squared Error Equalization Using a Priori Information," IEEE Trans. Signal Process., vol. 50, No. 3, pp. 673-683, Mar. 2002.
H. Lou and C. Xiao, "Soft-Decision Feedback Turbo Equalization for Multilevel Modulations," IEEE Trans. Signal Process., vol. 59, No. 1, pp. 186-195, Jan. 2011.
S. Haykin, Adaptive Filter Theory, 4th ed. Upper Saddle River, New Jersey, 07458.: Prentice Hall, 2002. (Not attached).
D. L. Duttweiler, "Proportionate Normalized Least-Mean-Squares Adaptation in Echo Cancelers," IEE Trans. Speech, Audio Process., vol. 8, No. 5, pp. 508-518, Sep. 2000.
A. J. Paulraj, D. A. Gore, R. U. Nabar, and H. Bolcskei, "An Overview of MIMO Communications—A Key to Gigabit Wireless," Proceedings of the IEEE, vol. 92, No. 2, pp. 198-218, Feb. 2004.
S. Ten Brink, "Convergence Behavior of Iteratively Decoded Parallel Concatenated Codes," IEEE Transaction on Communications, vol. 49, No. 10, pp. 1727-1737, 2001.

* cited by examiner

DESCRIPTION OF THE HYDROPHONE ARRAYS

| Rx Array name/type | Range (m) | Orientation | Number of hydrophones | Hydrophone spacing (cm) |
|---|---|---|---|---|
| S1/Cross | 60 | Southeast | 16 | 3.75 |
| S2/Cross | 60 | Southwest | 16 | 3.75 |
| S3/Vertical | 200 | Southeast | 24 | 5 |
| S4/Vertical | 200 | Southwest | 24 | 5 |
| S5/Vertical | 1000 | Southeast | 12 | 12 |
| S6/Vertical | 1000 | Southwest | 12 | 12 |

FIG. 5

TRAINING OVERHEADS AND THE CORRESPONDING INFORMATION RATES FOR DIFFERENT COMBINATIONS OF MODULATION AND MIMO SIZE

| Modulation | MIMO size | Block size ($K_b$) | Training overhead ($\xi$) | Information rate (kbps) |
|---|---|---|---|---|
| QPSK | 2 × 6 | 3600 | 13.89% | 16.82 |
| | 3 × 12 | 2200 | 22.73% | 22.64 |
| | 4 × 12 | 1800 | 27.78% | 28.22 |
| 8PSK | 2 × 6 | 2200 | 22.73% | 22.64 |
| | 3 × 12 | 1800 | 27.78% | 31.74 |
| | 4 × 12 | 1200 | 41.76% | 34.18 |
| 16QAM | 2 × 6 | 1800 | 27.78% | 28.22 |
| | 3 × 12 | 1500 | 33.33% | 39.06 |
| | 4 × 12 | 1050 | 47.62% | 40.92 |

FIG. 9

TOTAL NUMBER OF PACKETS ACHIEVING THE SPECIFIED BER LEVEL ($2 \times 6$ MIMO) ← 1000

| Range | # of turbo iter. | QPSK (BER = 0) | | 8PSK (BER < $10^{-4}$) | | 16QAM (BER < $10^{-3}$) | |
|---|---|---|---|---|---|---|---|
| | | NLMS | IPNLMS | NLMS | IPNLMS | NLMS | IPNLMS |
| 200 m (45 packets in total) | 0 | 0 | 0 | 0 | 0 | 0 | 0 |
| | 1 | 14 | 26 | 7 | 8 | 3 | 12 |
| | 2 | 34 | 40 | 16 | 24 | 8 | 25 |
| | 3 | 42 | 43 | 20 | 26 | 14 | 32 |
| | 4 | 42 | 43 | 24 | 31 | 19 | 35 |
| | 5 | 43 | 44 | 26 | 31 | 20 | 35 |
| 1000 m (19 packets in total) | 0 | 0 | 3 | 0 | 0 | 0 | 0 |
| | 1 | 10 | 16 | 7 | 7 | 4 | 7 |
| | 2 | 15 | 16 | 8 | 8 | 8 | 13 |
| | 3 | 16 | 16 | 8 | 8 | 10 | 13 |
| | 4 | 16 | 17 | 8 | 8 | 11 | 13 |
| | 5 | 16 | 17 | 8 | 8 | 11 | 13 |

FIG. 10

TURBO RECEIVERS FOR MULTIPLE-INPUT MULTIPLE-OUTPUT UNDERWATER ACOUSTIC COMMUNICATIONS

STATEMENT REGARDING FEDERALLY SPONSORED RESEARCH OR DEVELOPMENT

This invention was made with U.S. Government support by way of Grant Numbers ECCS-0846486 and ECCS-1408316 awarded by the National Science Foundation and Grand Numbers N00014-10-1-0174 and N00014-07-1-0219 awarded by the Office of Naval Research. The Government has certain rights in the invention. See 35 U.S.C. § 202(c)(6).

CROSS-REFERENCE TO RELATED APPLICATIONS

None.

FIELD

The present invention relates generally to improved systems and methods for performing turbo equalization and decoding of multiple-input multiple-output ("MIMO") underwater acoustic communications.

BACKGROUND

Wireless underwater communication using an acoustic channel as the physical layer for communication is desirable for many types of scientific and commercial endeavors in the ocean. However, the underwater acoustic ("UWA") channel presents many unique challenges for the design of underwater communication systems. Some of these challenges include time-varying multipath signals due to reflections off the moving surface waves and rough ocean bottom, which can cause echoes and signal interference. Further, relative motion of a transmitter, communication medium, and a receiver induces Doppler spread of the signal. In addition, noise is introduced by wind, shipping traffic, and various forms of ocean life, which can mask a portion of the signal and block the corresponding carried data. These challenges can cause the UWA signal to fluctuate randomly and as a result make the selection of modulation and error correction techniques very challenging.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

At a high level, aspects of this disclosure provide technologies for underwater communication systems and, in some embodiments in particular, systems and methods that utilize a soft-decision adaptive turbo equalization scheme. The data reuse technique may be adopted such that the adaptive equalizer itself performs channel equalization and iterative symbol detection, enabling the usage of a posteriori soft decisions for the equalizer adaptation and the soft interference cancellation. Hence, two layers of iterative processing may occur, a first layer of symbol detection where information about a received signal is iteratively exchanged between an adaptive equalizer and a soft decoder, and a second layer inside the adaptive equalizer itself. Attributed to the better fidelity of the a posteriori soft decisions as compared with the a priori soft decisions employed in other adaptive turbo equalization, the soft-decision adaptive turbo equalization not only provides robust detection performance but also is very efficient in terms of spectral utilization and processing delay.

BRIEF DESCRIPTION OF THE DRAWINGS

The present invention is described in detail herein with reference to the attached drawing figures, which are incorporated herein by reference, wherein:

FIG. 5 depicts a table containing information related to data from the SPACE08 undersea experiment used for a test of aspects hereof;

FIG. 9 depicts a table containing information related to data from a test of aspects hereof;

FIG. 10 depicts a table containing information related to data from a test of aspects hereof;

DETAILED DESCRIPTION

Figure 1:
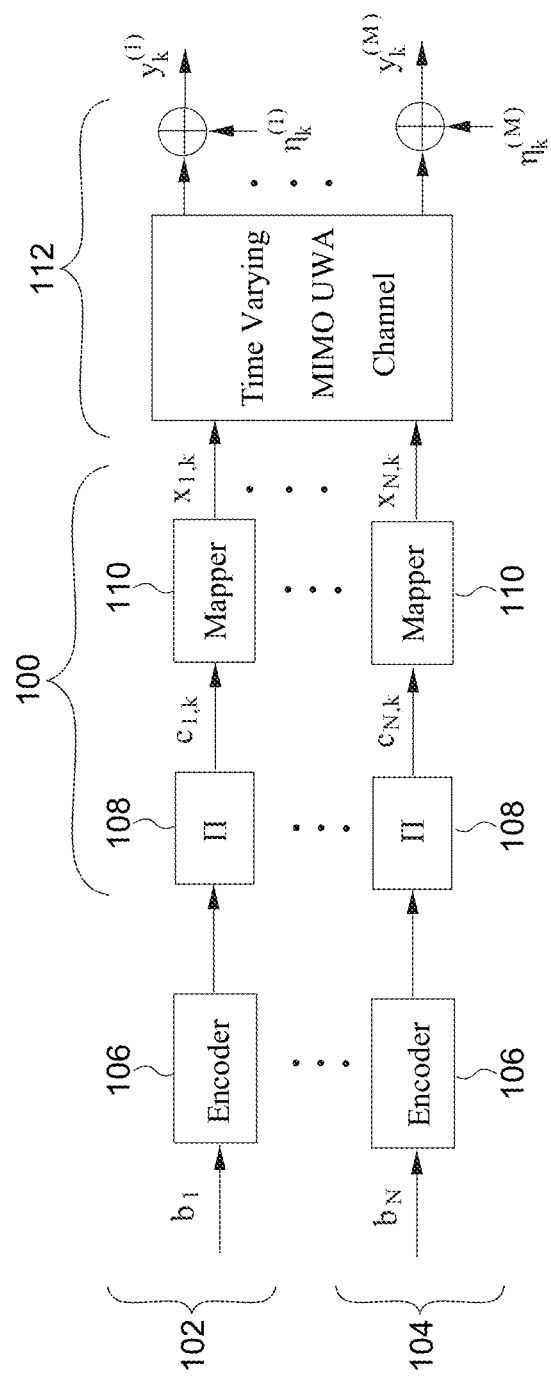
FIG. 1 depicts a block diagram of an exemplary transmit system for a MIMO UWA communication system in accordance with an aspect hereof.

Subject matter is described throughout this disclosure in detail and with specificity in order to meet statutory requirements. But the aspects described throughout this disclosure are intended to be illustrative rather than restrictive, and the description itself is not intended necessarily to limit the scope of the claims. Rather, the claimed subject matter might be practiced in other ways to include different elements or combinations of elements that are similar to the ones described in this disclosure and that are in conjunction with other present, or future, technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by and is within the scope of the claims.

At a high level, aspects of this disclosure provide technologies for underwater communication systems and, in some embodiments in particular, systems and methods that utilize a soft-decision adaptive turbo equalization scheme. The data reuse technique may be adopted such that the adaptive equalizer itself performs iterative channel equalization and symbol detection, enabling the usage of a posteriori soft decisions for the equalizer adaptation and the soft interference cancellation. Hence, two layers of iterative processing may occur, a first layer of symbol detection where information about a received signal is iteratively exchanged between an adaptive equalizer and a soft decoder, and a second layer inside the adaptive equalizer itself. Attributed to the better fidelity of the a posteriori soft decisions as compared with the a priori soft decisions employed in other adaptive turbo equalization, the soft-decision adaptive turbo equalization not only provides robust detection performance but is very efficient in terms of spectral utilization and processing delay.

MIMO UWA communication exhibits unique technical challenges due to the triply selective property of the underlying MIMO UWA channel, for which the signal simultaneously experiences frequency selectivity, time selectivity, and spatial selectivity. The frequency selectivity and the time selectivity are generally very severe due to the extremely long delay spread and the rapid dynamics of the UWA channel. For example, a medium-range horizontal UWA channel can have a delay spread of several tens of milliseconds spanning several tens or even hundreds of symbol periods, and the channel coherence time is typically several tens of milliseconds. Further, the spatial selectivity leads to different gains among different transmit and receive elements, adding to the difficulty of signal detection.

The harsh MIMO UWA channel demands powerful signal detection techniques. Turbo equalization is one such detection scheme. Turbo equalization typically consists of two components: a soft-input soft-output equalizer and a soft-input soft-output decoder, which iteratively exchange extrinsic information to improve the detection performance. The turbo equalization applied to UWA communications falls into two classes: channel estimation based turbo equalization ("CE-TEQ"); and adaptive turbo equalization ("ATEQ") with no need of explicit channel knowledge. The equalizer for a CE-TEQ can be a minimum mean square error ("MMSE") linear equalizer or a MMSE decision-feedback equalizer ("DFE"), where the calculation of the MMSE equalizer coefficients requires the knowledge of the UWA channel. Since the length of the UWA channel is usually long, the computation of the equalizer coefficients involves a large-dimension matrix inversion, leading to high complexity. The complexity can be further amplified when a MIMO system with multiple transducers and hydrophones is deployed due to the increased size of the covariance matrix to be inverted. The high complexity means a long signal processing delay, making the CE-TEQ impractical for real-time applications. On the other hand, an ATEQ takes advantage of the low complexity achieved by directly adjusting the equalizer coefficients without any matrix inversion operation. An ATEQ generally achieves suboptimal performance by approaching that of the Wiener filtering and demands for fine parameter tuning (which is nontrivial for MIMO UWA communication due to the abundant equalizer coefficients to be adapted) so as to make the adaptive equalizer converge.

A soft-input soft-output equalizer used in ATEQ may include two filters: a feedforward filter with the received samples as its input; and a soft interference cancellation ("SIC") filter with the estimation of transmit symbols as its input. The adaptation of the feedforward filter and the SIC filter, as well as the quality of the SIC filter input are important for the success of the adaptive turbo equalization. In training mode, the filter adaptation and the SIC formulation are routine procedures since the reference symbols are a priori perfectly known. It is during the decision directed ("DD") phase, diverse filter adaptation and SIC formulation methods are proposed, leading to different ATEQ schemes of different performance. In some aspects, the hard decision on the equalizer output is used to drive the filter adaptation and the SIC input is the a priori soft symbol estimation from the channel decoder. Data reuse, meaning filter adaptation and symbol detection repeated several times over the same set of data, may help improve the detection performance as well as speed up the filter convergence. In other words, data reuse shortens the training sequence and improves transmission efficiency. In other aspects, hard decisions of the a priori soft symbol estimations from the decoder are delivered as the SIC filter input. For these aspects, the decoder a priori soft decisions ("SD") are also incorporated into the filter adaptation in order to mitigate the error propagation effect of the hard decisions. This scheme, however, may still require a very long training sequence for the initialization of the equalizer Much of the existing work on ATEQs for UWA communication concerns single-input multiple-output ("SIMO") transmission and MIMO transmission in a two-transducer scenario using a low-order QPSK modulation. An efficient ATEQ, however, is for MIMO UWA communications with multiple transmit elements and multilevel modulations (e.g., 8PSK and 16QAM). The scheme may adopt the low-complexity normalized least mean squares ("NLMS") algorithm and/or the improved proportionate normalized least mean squares ("IPNLMS") algorithm while still employing the data reuse technique. Compared with existing ATEQ schemes, the scheme is improved in both filter adaptation and SIC formulation. These improvements may be achieved by using a posteriori soft decisions at the equalizer output, which are available in the data reuse iteration. The a posteriori soft decisions have better fidelity than the a priori soft decisions due to the extra information gleaned in the equalization process. Moreover, the a posteriori soft decisions are utilized in a block-wise way, which leads to low complexity and high performance. The proposed scheme not only achieves error-free detection for most QPSK packets in MIMO transmission with up to three transmit elements, but also works well in MIMO transmission with multilevel modulations like 8PSK and 16QAM, as shown by the experimental results discussed infra. Furthermore, relatively short training sequences were found to be sufficient, resulting in improvements in the transmission efficiency.

The ATEQ scheme has been tested by using extensive experimental data collected in the 2008 Surface Processes and Acoustic Communications Experiment ("SPACE08"). The low-complexity NLMS algorithm and the sparsity enhanced IPNLMS algorithm were both tested. Off-line processing results show the proposed ATEQ detects almost all QPSK packets without error in the MIMO transmission with two or three transmit elements, at a low training overhead. For MIMO transmission with multilevel 8PSK and 16QAM modulations and up to three concurrent transmit streams, the proposed ATEQ scheme achieves good detection with a reasonable training overhead. It was also observed that the performance gain of the IPNLMS algorithm over the NLMS algorithm depends on the modulation and the MIMO size. For example, when low-order MIMO transmission with QPSK or 8PSK modulations are used the low-complexity NLMS algorithm is sufficient for the proposed ATEQ to achieve high performance. However, when 16QAM modulation or higher-order MIMO transmission is employed, the IPNLMS outperforms the NLMS by making use of the sparse property of the equalizer.

Throughout this disclosure the superscripts $(\cdot)^*$, $(\cdot)^T$ and $(\cdot)^H$ represent, respectively, the conjugate, the matrix transpose, and the matrix Hermitian, and $\mathbb{E}\{\cdot\}$ denotes the statistical expectation. Also throughout this disclosure, the function tan h(x) denotes the hyperbolic tangent and the matrix diag $\{d_1, d_2, \ldots, d_j\}$ is a j×j diagonal matrix with diagonal elements $d_1, d_2, \ldots, d_j$.

An N×M single-carrier MIMO UWA communication system with spatial multiplexing may include a transmitter side having N transducers and a receiver side having M hydrophones. Referring to FIG. 1, an exemplary aspect of the transmitter side 100 of the communication system is depicted. At the transmitter side 100, the incoming information bits are serial-to-parallel converted into N parallel streams $\{b_n\}_{n=1}^{N}$, transmitted by the N transducers. Depicted are a first stream 102 and an n-th stream 104. In other aspects, however, more than two parallel streams may be present on the transmit side 100. On each parallel stream, the information bits (e.g., $b_1$) are encoded with an encoder 106 and interleaved with an interleaver 108. Each of the q interleaved bits (e.g., on the n-th transmit branch: $c_{n,k} \triangleq [c_{n,k}^1 c_{n,k}^2 \ldots c_{n,k}^q]$) are mapped to one modulation symbol $x_{n,k}$ taken from a $2^q$-ary constellation set S=$\{\alpha_1, \alpha_2, \ldots, \alpha_{2^q}\}$ by a mapper 110. A given constellation point $\alpha_i$ is mapped to a pre-determined bit pattern $s_i=[s_{i,1} s_{i,2} \ldots s_{i,q}]$ with $s_{i,j} \in \{0,1\}$. The N transducers then transmit the acoustic signal through the MIMO UWA channel 112, where noise $\eta_k^{(M)}$ may be added to the transmitted signal. The received baseband signal on the m-th hydrophone $y_k^{(M)}$.

The received baseband signal on the m-th hydrophone element at the time k is given by $$y_k^{(m)} = \sum_{n=1}^{N} \sum_{l=0}^{L-1} h_l^{(m,n)} x_{n,k-l} + \eta_k^{(m)} \quad (1)$$

where $h_l^{(m,n)}$ denotes the l-th tap of the length-L equivalent channel between the n-th transducer element and the m-th hydrophone element, and $\eta_k^{(m)}$ is the additive noise. Stacking up the receive samples of the M hydrophone as $y_k = [y_k^{(1)}, y_k^{(2)}, \ldots, y_k^{(M)}]^T$, one has the space-time representation as $$y_k = \sum_{l=0}^{L-1} h_l x_{k-l} + \eta_k \quad (2)$$

where $$x_k = [x_{1,k}, x_{2,k}, \ldots, x_{N,k}]^T \quad (3)$$

$$\eta_k = [\eta_k^{(1)}, \eta_k^{(2)}, \ldots, \eta_k^{(M)}]^T \quad (4)$$

$$h_l = \begin{bmatrix} h_l^{(1,1)} & h_l^{(1,2)} & \ldots & h_l^{(1,N)} \\ h_l^{(2,1)} & h_l^{(2,2)} & \ldots & h_l^{(2,N)} \\ \vdots & \vdots & \ddots & \vdots \\ h_l^{(M,1)} & h_l^{(M,2)} & \ldots & h_l^{(M,N)} \end{bmatrix}. \quad (5)$$

Figure 2:
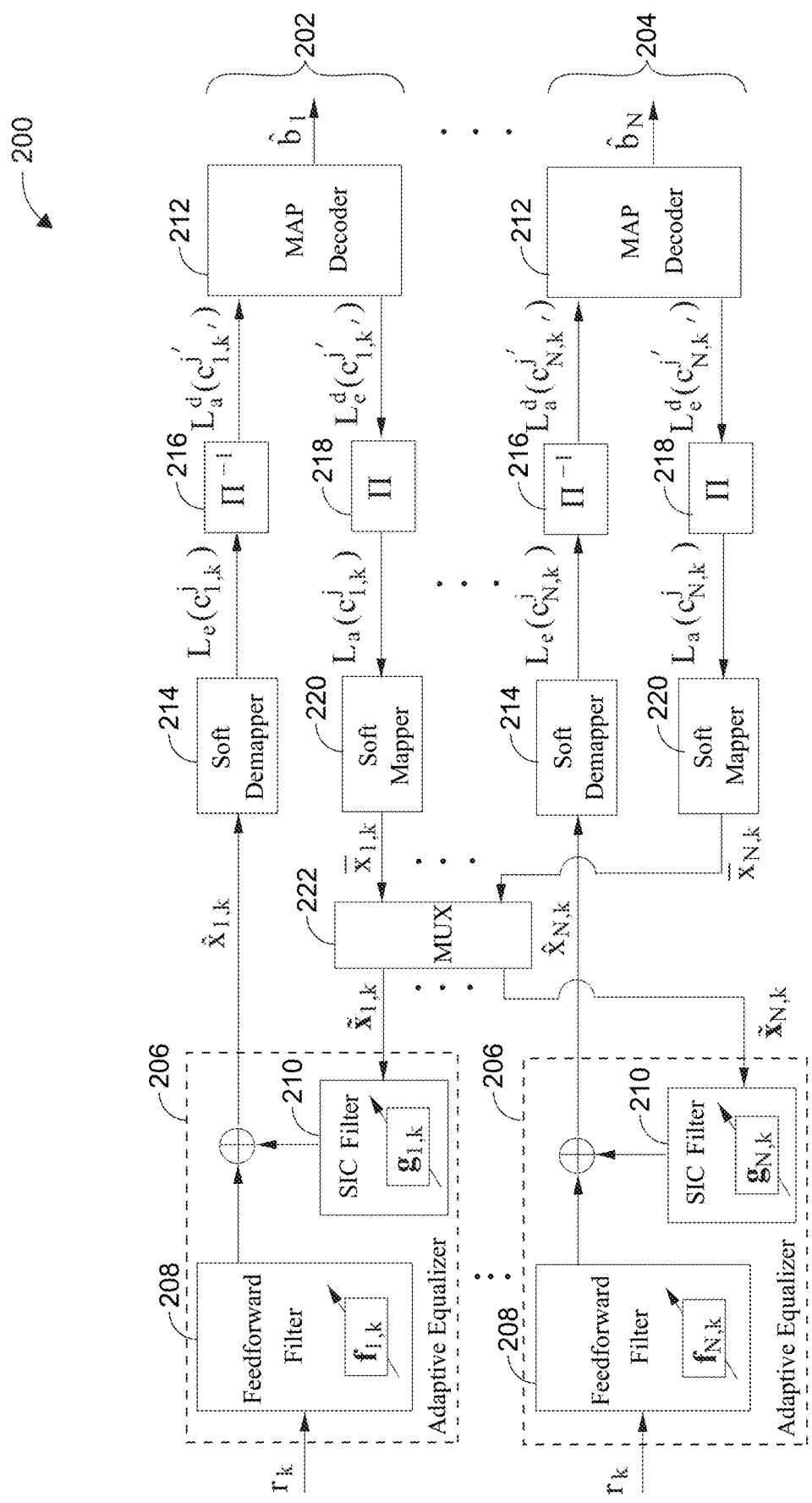
FIG. 2 depicts a block diagram of an exemplary adaptive turbo equalization system of the MIMO UWA communication system in accordance with an aspect hereof.

Turning now to FIG. 2, an exemplary aspect of a receiver side 200 of the communication system is depicted. The illustrated aspect of the receiver side 200 includes N parallel streams. For the sake of brevity, only a first stream 202 and an Nth stream 204 are depicted. In other aspects, however, more than two parallel streams may be present on the receiver side 200. Each stream may include an adaptive equalizer 206 into which the received signal $r_k$ is input. The adaptive equalizer 206 is shown comprising two units: a feedforward filtering unit ("feedforward filter") 208 and a soft interference cancellation unit ("SIC filter") 210. The SIC may be performed using the a priori soft decision $\bar{x}_{n,k}$, calculated with the bit a priori log likelihood ratio ("LLR") $L_a(c_{n,k}^j)$ from a maximum a posteriori probability ("MAP") decoder 212 as $$\bar{x}_{n,k} = \mathbb{E}\left[x_{n,k} \mid \{L_a(c_{n,k}^j)\}_{j=1}^q\right] = \sum_{\alpha_i \in S} \alpha_i P(x_{n,k} = \alpha_i) \quad (6)$$

where $$P(x_{n,k} = \alpha_i) = \prod_{j=1}^q \frac{1}{2}(1 + \tilde{s}_{i,j} \tanh(L_a(c_{n,k}^j)/2)) \quad (7)$$

with $$\tilde{s}_{i,j} = \begin{cases} +1 & \text{if } s_{i,j} = 0 \\ -1 & \text{if } s_{i,j} = 1 \end{cases}.$$

An equalizer output $\hat{x}_{n,k}$ (i.e., an equalized symbol), comprising a combination of an output from the feedforward filter 208 and an output from the SIC filter 210, is input into a soft demapper 214. The equalizer output is given as $$\hat{x}_{n,k} = f_{n,k}^H r_k + g_{n,k}^H \tilde{x}_{n,k} \quad (8)$$

where $r_k = [y_{k+K_1}^T, \ldots, y_{k-K_2}^T]^T$, and $\tilde{x}_{n,k} = [(\bar{x}_{n,k-K_3})^T, \ldots, (\tilde{x}_{n,k})^T, \ldots, (\bar{x}_{n,k+K_4})^T]^T$ with $\bar{x}_{n,k'} = [\bar{x}_{1,k'}, \bar{x}_{2,k'}, \ldots, \bar{x}_{N,k'}]^T$ when k'≠k, and $\tilde{x}_{n,k} = [\bar{x}_{1,k'}, \ldots, \bar{x}_{n-1,k'}, 0, \bar{x}_{n+1,k'}, \ldots, \bar{x}_{N,k'}]^T$ when k'=k. The parameters $K_1$, $K_2$, $K_3$, $K_4$ are non-negative integers. A length of the feedforward filter 208 and a length of the SIC filter 210 are $M(K_1+K_2+1)$ and $N(K_3+K_4)$, respectively, leading to a combined filter length of $K_{eq}=M(K_1+K_2+1)+N(K_3+K_4)$. It is noted $K_{eq}$ is the number of coefficients for a particular transmit stream, and the total number of coefficients for the adaptive equalizer 206 shall be scaled by a factor of N. For notation convenience, equation (8) may be expressed as $$\hat{x}_{n,k} = w_{n,k}^H u_k \quad (9)$$

where $$w_{n,k} = [f_{n,k}^T \ g_{n,k}^T]^T \quad (10)$$

$$u_k = [r_k^T \ \tilde{x}_{n,k}^T]^T \quad (11)$$

The equalized symbol $\hat{x}_{n,k}$ is translated into extrinsic bit LLRs $L_e(c_{n,k}^j)$ by the soft demapper 214. The extrinsic bit LLRs $L_e(c_{n,k}^j)$ are de-interleaved by a de-interleaver 216 and input as a priori LLRs $L_a^d(c_{n,k}^{j'})$ of the MAP decoder 212. After decoding, the MAP decoder 212 outputs its extrinsic LLRs $L_e^d(c_{n,k}^{j'})$, which are interleaved by interleaver 218. After interleaving, the extrinsic LLRs $L_e^d(c_{n,k}^{j'})$ are fed back to the adaptive equalizer 206 as a priori LLR input $L_a(c_{n,k}^j)$. In other words, a soft mapper 220 uses the a priori LLR input $L_a(c_{n,k}^j)$ to calculate an a priori soft decision $\bar{x}_{n,k}$, which is input into a multiplexer 222. The multiplexer 222 assembles the soft decision symbols $\bar{x}_{n,k}$ into the corresponding signal vectors $\tilde{x}_{n,k}$, which is input into the adaptive equalizer 206 at the SIC filter 210. The extrinsic information is iteratively exchanged between the adaptive equalizer 206 and the MAP decoder 212 as thus described, with its reliability increasing with the number of iterations. Once the iterative procedure is finished (for example, when the filters of the adaptive turbo equalizer has converged) the hard decisions on the information bits $\hat{b}_n$ are made and output from the MAP decoder 212.

Adaptive turbo equalization usually comprises both a training mode and a DD mode. In some aspects, adaptive turbo equalization may use the NLMS algorithm. For example, in the training mode the equalizer vector using the NLMS algorithm updates the coefficients as follows $$w_{n,k+1} = w_{n,k} + \frac{\mu(x_{n,k} - \hat{x}_{n,k})^* u_k}{\delta_{NLMS} + u_k^H u_k}, 1 \le k \le K_p \quad (12)$$

where $\mu$ is the step size, $\delta_{NLMS}$ is a small number for regularizing the adaptation (avoiding division by zero), $x_{n,k}$ is the training symbol known a priori, and $K_p$ is the length of the training sequence.

In the DD mode, updating of the equalizer vector using the NLMS algorithm is as follows $$w_{n,k+1} = w_{n,k} + \frac{\mu(Q(\hat{x}_{n,k}) - \hat{x}_{n,k})^* u_k}{\delta_{NLMS} + u_k^H u_k}, K_p < k \le K_b \quad (13)$$

where $Q(\hat{x}_{n,k})$ denotes the tentative hard decision on the equalizer output, and $K_b$ is the length of each processed block.

As mentioned above, the length of the concatenated feedforward filter 208 and the SIC filter 210 is $K_{eq}=M(K_1+K_2+1)+N(K_3+K_4)$. Due to the long delay spread of the underwater channel and the multiple transmit and receive elements, the number of equalizer coefficients to be adapted is large. Thus, to make the adaptive equalizer converge a long training sequence is required. A long training sequence, however, sacrifices transmission efficiency. To avoid the long training sequence, a data reuse technique may be applied in a hard-decision directed adaptive turbo equalization (HD-ATEQ) scheme and/or an iterative channel estimation based turbo equalization.

An exemplary aspect of a hard-decision directed equalizer adaptation with data reuse is demonstrated in FIG. 3, where the tap updating is repeated over the same block of received signals for a plurality of times as follows $$w_{n,k+1}^{t+1} = w_{n,k}^{t+1} + \frac{\mu(Q(\hat{x}_{n,k}^{t+1}) - \hat{x}_{n,k}^{t+1})^* u_k}{\delta_{NLMS} + u_k^H u_k}, K_p < k \le K_b, t \ge 0 \quad (14)$$

where the superscript t+1 denotes the (t+1)-th round of data reuse, and $\hat{x}_{n,k}^{t+1} = w_{n,k}^{t+1^H} u_k$. The purpose of using t+1 as the index of the data reuse round is for the convenience of comparison with the proposed soft-decision adaptive turbo equalization, as discussed herein. The adaptation of the equalizer vector $w_{n,k+1}^0$ at the zero-th round of data reuse is actually the same as that of equation (14) as it is noted that $w_{n,1}^{t+1} = w_{n,K_b+1}^t$.

Figure 3:
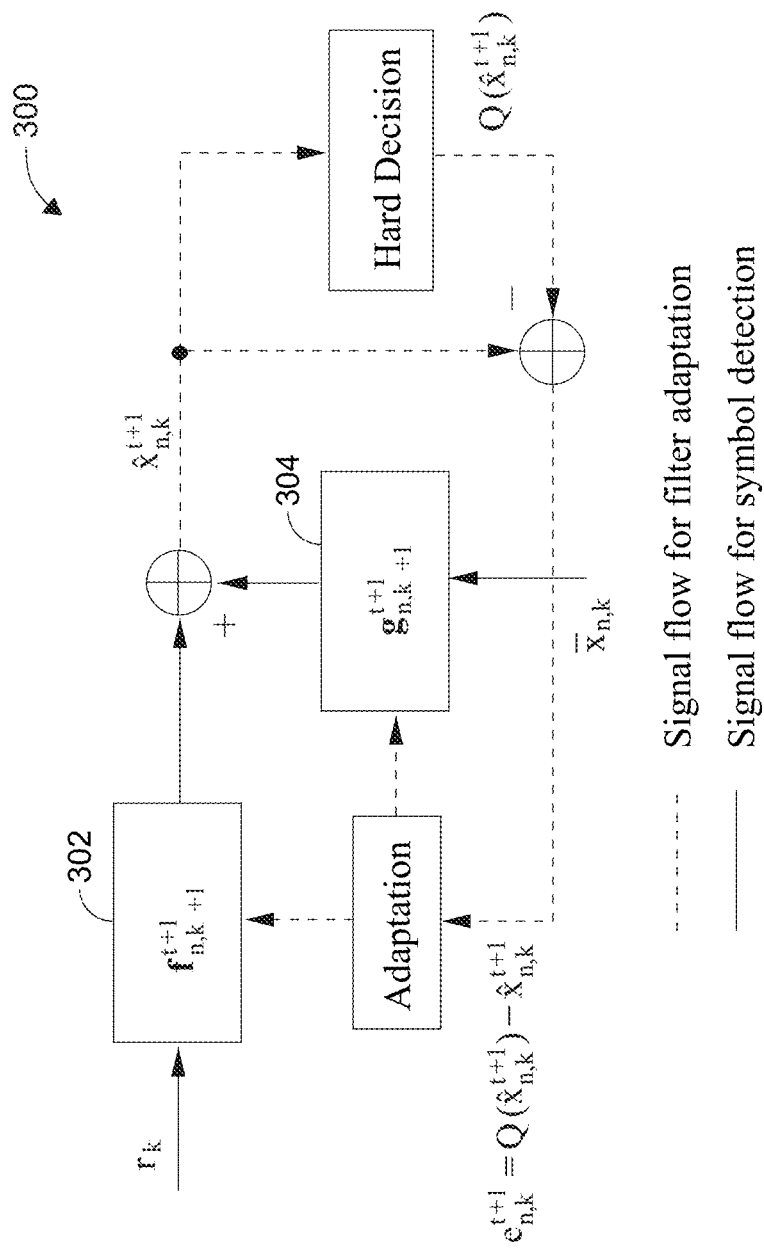
FIG. 3 depicts a block diagram of an exemplary signal flow of the hard-decision adaptive equalizer of the MIMO UWA communication system in accordance with an aspect hereof.

As depicted in FIG. 3, a received signal $r_k$ may be input into an exemplary HD-ATEQ 300 at a feedforward filter 302 and an soft decision $\bar{x}_{n,k}$ may be input in the HD-ATEQ 300 at a SIC filter 304. The equalizer output $\hat{x}_{n,k}^{t+1}$, which is a combination of outputs from the feedforward filter 302 and the SIC filter 304, may be used for both symbol detection and filter adaptation. For symbol detection, the equalizer output $\hat{x}_{n,k}^{t+1}$ is demapped and de-interleaved as it is sent to a MAP decoder, as described in relation to FIG. 2. The soft decision $\bar{x}_{n,k}$ may be returned from the soft demapper and input into the SIC filter 304, as described in relation to FIG. 2. For filter adaptation, the equalizer output $\hat{x}_{n,k}^{t+1}$ may be used to make a tentative hard decision $Q(\hat{x}_{n,k}^{t+1})$ of the (n,k)th symbol. An apparent error $e_{n,k}^{t+1}$ may be determined by subtracting the equalizer output $\hat{x}_{n,k}^{t+1}$ from the tentative hard decision $Q(\hat{x}_{n,k}^{t+1})$. The feedforward filter 302 and the SIC filter 304 may be adjusted based upon the apparent error $e_{n,k}^{t+1}$.

The HD-ATEQ may suffer from error propagation ("EP") when used for UWA communications. For example, at low SNR or severe multipath/Doppler channel, a one-bit error that the HD-ATEQ made in a block may propagate in the subsequent Turbo iterations, causing catastrophic EP.

Figure 4:
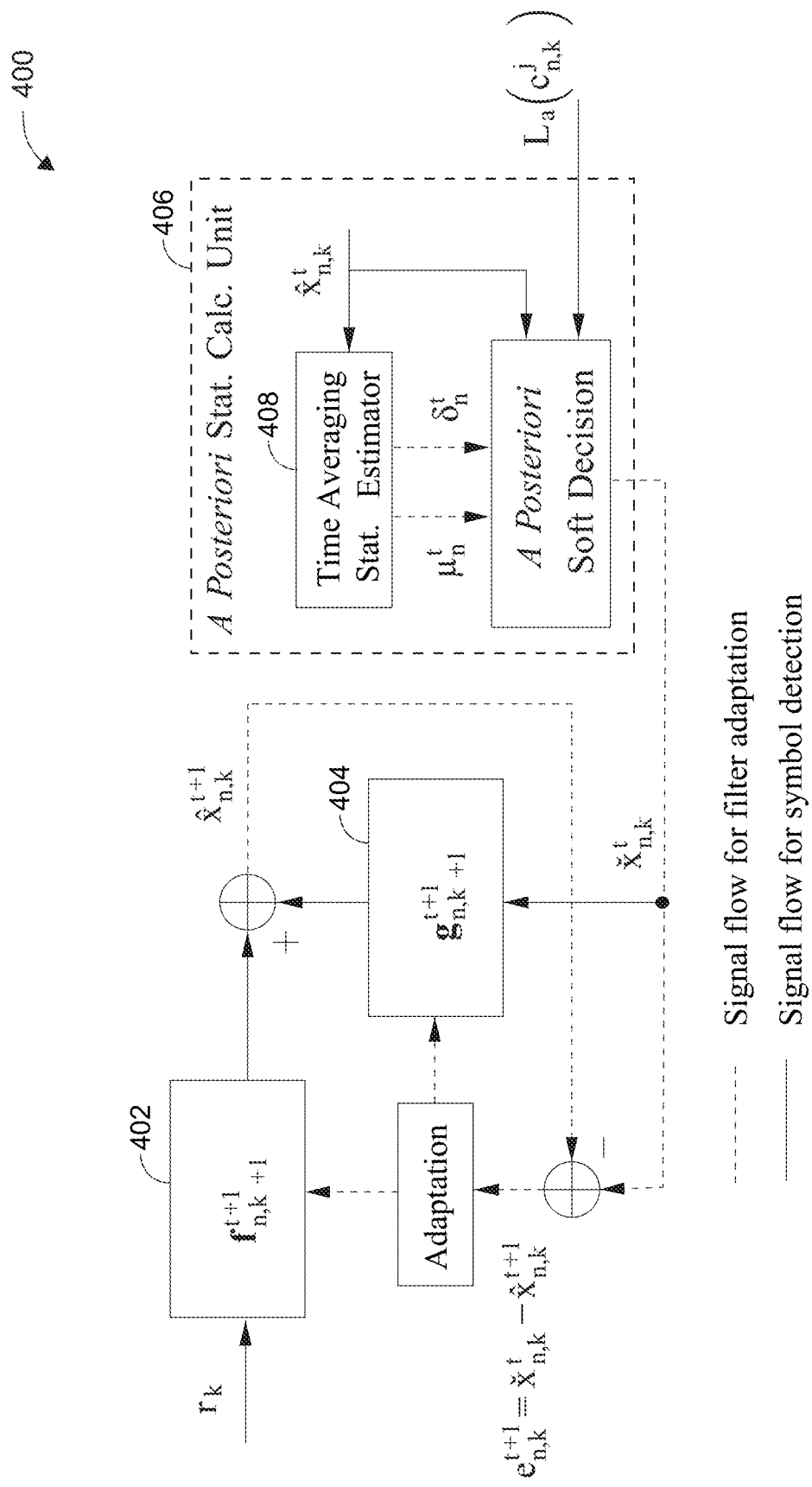
FIG. 4 depicts a block diagram of an exemplary signal flow of soft-decision adaptive turbo equalizer of the MIMO UWA communication system in accordance with an aspect hereof.

Another adaptive turbo equalization scheme may include performing the equalizer adaptation and the SIC filtering with soft decisions, as depicted in FIG. 4. For notation convenience, the soft-decision adaptive turbo equalization is called SD-ATEQ. There are two layers of iterative processing in adaptive turbo equalization: the outer-layer iteration (i.e., symbol detection) between the adaptive equalizer (e.g., 206 from FIG. 2) and the MAP decoder (e.g., 214 from FIG. 2), and the inner-layer iteration (i.e., data reuse for filter adaptation) inside the adaptive equalizer itself, as depicted in FIG. 4. For notation convenience, each outer-layer iteration is called a "turbo iteration," and each inner-layer iteration is called an "equalizer iteration." The soft decisions are fed back in a block-wise way inside the adaptive equalizer, which improves the robustness and performance of the adaptive turbo equalization as well as reduces the complexity. Below, the computation of the a posteriori soft decision is first described, then the a posteriori soft decision based equalizer adaptation and SIC are described.

The turbo iterations of the SD-ATEQ operate as described above in reference to FIG. 2. Hence, the received signal $r_k$ may be input into the SD-ATEQ 400 at a feedforward filter 402 and an a posteriori soft decision $\check{x}_{n,k}^t$ may be input in the SD-ATEQ 400 at a SIC filter 404. The equalizer output $\hat{x}_{n,k}^{t+1}$, which is a combination of outputs from the feedforward filter 402 and the SIC filter 404, may be used for both symbol detection and filter adaptation. For symbol detection, the equalizer output $\hat{x}_{n,k}^{t+1}$ is demapped and de-interleaved as it is sent to a MAP decoder, as described in relation to FIG. 2. The a posteriori soft decision $\check{x}_{n,k}^t$ may be returned from the MAP decoder and input into the SIC filter 404, as described in relation to FIG. 2.

The equalizer iterations of the SD-ATEQ adjust the feedforward filter (e.g., 402) and the SIC filter (e.g., 404) based upon an apparent error $e_{n,k}^{t+1}$. The apparent error $e_{n,k}^{t+1}$ of the SD-ATEQ is determined by subtracting the equalizer output $\hat{x}_{n,k}^{t+1}$ (of the present equalization iteration) from an a posteriori soft decision $\check{x}_{n,k}^t$ (made with the equalizer output the previous equalizer iteration). As shown in FIG. 4, the SD-ATEQ 400 may include an a posteriori statistical calculation unit 406 having a time averaging statistical estimator 408. The equalizer output $\hat{x}_{n,k}^t$ (of the previous equalizer iteration) may be input into the time averaging statistical estimator 408 to estimate mean $\mu_n^t$ and variance $\delta_n^t$ of the soft symbols. The equalizer output $\hat{x}_{n,k}^t$ (of the previous equalizer iteration) together with the estimated mean $\mu_n^t$ and variance $\delta_n^t$ of the soft symbols and the bit a priori LLRs from the MAP decoder are used to determine the a posteriori soft decision $\check{x}_{n,k}^t$.

At the t-th (t≥0) round of equalizer iteration, the a posteriori soft decision $\check{x}_{n,k}^t$ of the equalized symbol $\hat{x}_{n,k}^t$ is calculated as $$\check{x}_{n,k}^t = \sum_{\alpha_i \in S} \alpha_i P(x_{n,k} = \alpha_i \mid \hat{x}_{n,k}^t) \tag{15}$$

where the a posteriori probability $P(x_{n,k}=\alpha_i|\hat{x}_{n,k}^t)$ is given as $$P(x_{n,k} = \alpha_i \mid \hat{x}_{n,k}^t) = \frac{p(\hat{x}_{n,k}^t \mid x_{n,k} = \alpha_i) P(x_{n,k} = \alpha_i)}{p(\hat{x}_{n,k}^t)} \tag{16}$$

The a priori probability $P(x_{n,k}=\alpha_i)$ is computed with the a priori LLRs (e.g., as determined in equation (7)), and $p(\hat{x}_{n,k}^t)$ is obtained via the normalization $\Sigma_{i=1}^{2^q} P(x_{n,k}=\alpha_i|\hat{x}_{n,k}^t)=1$. The equalizer output $\hat{x}_{n,k}^t$ conditioned on $x_{n,k}=\alpha_i$ is assumed to follow a Gaussian distribution, as $$p(\hat{x}_{n,k}^t \mid x_{n,k} = \alpha_i) = \frac{1}{\pi \delta_n^t} \exp\left\{-\frac{|\hat{x}_{n,k}^t - \mu_n^t \alpha_i|^2}{\delta_n^t}\right\} \tag{17}$$

where $$\mu_n^t = \frac{1}{K_d} \sum_{k=K_p+1}^{K_b} \frac{\hat{x}_{n,k}^t}{Q(\hat{x}_{n,k}^t)} \tag{18}$$

$$\delta_n^t = \frac{1}{K_d} \sum_{k=K_p+1}^{K_b} \left| \hat{x}_{n,k}^t - \mu_n^t Q(\hat{x}_{n,k}^t) \right|^2 \tag{19}$$

with $K_d = K_b - K_p$ being the length of information block. The evaluation of $\mu_n^t$ and $\delta_n^t$ relies on the entire block of estimated symbols. As a result, the a posteriori soft decisions are unavailable until all symbols in the block are equalized. This leads to the block-wise soft-decision feedback operation, where the a posteriori soft decision $\check{x}_{n,k}^t$ of the t-th equalizer iteration is used in the (t+1)-th equalizer iteration, as shown in FIG. 4. Over equalizer iterations, the reliability of the a posteriori soft decision $\check{x}_{n,k}^t$ increases and thus speeds up the convergence of the adaptive equalizer. Hence, the block-wise soft-decision feedback mechanism has the advantage of low complexity and high performance.

At the (t+1)-th equalizer iteration, the block of a posteriori soft decisions from the t-th equalizer iteration $\{\check{x}_{n,k}^t\}_{k=K_p+1}^{K_b}$ are fed into the filter adaptation unit, and the equalizer vector is updated as $$w_{n,k+1}^{t+1} = w_{n,k}^{t+1} + \frac{\mu(\check{x}_{n,k}^t - \hat{x}_{n,k}^{t+1})^* u_k}{\delta_{NLMS} + u_k^H u_k} \quad (t \geq 0) \tag{20}$$

The equalizer adaption at the zero-th equalizer iteration is different from that determined with equation (20), because there are no a posteriori soft decisions available. When the number of turbo iteration $N_{iter}>0$, the a priori soft decisions $\{\overline{x}_{n,k}\}_{k=K_p+1}^{K_b}$ are instead used for the equalizer adaptation. When $N_{iter}=0$, even the a priori soft decision $\overline{x}_{n,k}$ is unavailable, so the hard-decision directed equalizer adaptation as determined with equation (14) is adopted. In summary, one has the following equalizer adaptation at the zero-th equalizer iteration $$w_{n,k+1}^0 = \begin{cases} w_{n,k}^0 + \dfrac{\mu(\overline{x}_{n,k} - \hat{x}_{n,k}^0)^* u_k}{\delta_{NLMS} + u_k^H u_k}, & (N_{iter} > 0) \\[2ex] w_{n,k}^0 + \dfrac{\mu(Q(\hat{x}_{n,k}^0) - \hat{x}_{n,k}^0)^* u_k}{\delta_{NLMS} + u_k^H u_k}, & (N_{iter} = 0) \end{cases} \tag{21}$$

The training-mode equalizer adaptation as given by equation (12) is performed at each equalizer iteration of the data reuse procedure. Hence, the soft decisions are fed back in a block-wise way inside the adaptive equalizer, which improves the robustness and performance of the adaptive turbo equalization as well as reduces the complexity because of calculations performed with equations (20) and (21).

The sparsity enhanced IPNLMS algorithm has also been adopted to process the experimental data. The IPNLMS proportionately adapts the equalizer vector as $$w_{n,k+1}^{t+1} = w_{n,k}^{t+1} + \frac{\mu(\check{x}_{n,k}^{t} - \hat{x}_{n,k}^{t+1})^* G_{n,k} u_k}{u_k^H G_{n,k} u_k + \delta_{IPNLMS}} \quad (t \geq 0) \quad (22)$$

and $$w_{n,k+1}^{0} = \begin{cases} w_{n,k}^{0} + \frac{\mu(\bar{x}_{n,k} - \hat{x}_{n,k}^{0})^* G_{n,k} u_k}{u_k^H G_{n,k} u_k + \delta_{IPNLMS}}, & (N_{iter} > 0) \\ w_{n,k}^{0} + \frac{\mu(Q(\hat{x}_{n,k}^{0}) - \hat{x}_{n,k}^{0})^* G_{n,k} u_k}{u_k^H G_{n,k} u_k + \delta_{IPNLMS}}, & (N_{iter} = 0) \end{cases} \quad (23)$$

where $\delta_{IPNLMS}$ is a small positive number for regularization, and $G_{n,k}=$diag $\{g_{n,k}(0), g_{n,k}(1), \ldots, g_{n,k}(K_{eq}-1)\}$ is a diagonal proportionate matrix with the l'-th diagonal element given by $$g_{n,k}(l') = \frac{1-\alpha}{2K_{eq}} + (1+\alpha)\frac{|w_{n,k}^{t+1}(l')|}{2\|w_{n,k}^{t+1}\|_1 + \epsilon}, \quad 0 \leq l' \leq K_{eq}-1 \quad (24)$$

where $\in$ is also a regularization parameter introduced to avoid numerical instability, $w_{n,k}^{t+1}(l')$ is the l'-th element of $w_{n,k}^{t+1}$, and $|\bullet|$ and $\|\bullet\|_1$ are the absolute operator and the $l_1$-norm operator, respectively. The selection of $\alpha$ depends on the sparsity of the equalizer. When $\alpha=-1$, the IPNLMS reduces to the NLMS and the equalizer sparsity is not exploited. When $\alpha=1$, the IPNLMS behaves like the proportionate normalized least mean squares (PNLMS). The IPNLMS is still of linear complexity without involving any matrix inversion operation.

The performance of the SIC filter (e.g. 404) depends on the quality of the soft decision. Most adaptive turbo equalization schemes employ the a priori soft decisions for SIC. By utilizing the a posteriori soft decisions, which possess higher fidelity than the a priori soft decisions due to the extra information gleaned in the equalization process, one is able to improve the SIC. Specifically, with the improved SIC, the equalizer output $\hat{x}_{n,k}^{t+1}$ is given by $$\hat{x}_{n,k}^{t+1} = f_{n,k}^{t+1}{}^H r_k + g_{n,k}^{t+1}{}^H \check{x}_{n,k}^{t} \quad (25)$$

The a priori soft decisions $\tilde{x}_{n,k}$ in equation (8) have been replaced with the a posteriori soft decisions $\check{x}_{n,k}^{t} = [(\check{x}_{n,k-K_3}^{t})^T, \ldots, (\check{x}_{n,k}^{t})^T, \ldots, (\check{x}_{n,k+K_4}^{t})^T]^T$, where $\check{x}_{n,k'}^{t} = [\check{x}_{1,i'}^{t}, \check{x}_{2,k'}^{t}, \ldots, \check{x}_{N,k'}^{t}]^T$ when k'≠k, and $\check{x}_{n,k'}^{t} = [\check{x}_{1,k'}^{t}, \ldots, \check{x}_{n-1,k'}^{t}, 0, \check{x}_{n+1,k'}^{t}, \ldots, \check{x}_{N,k'}^{t}]^T$ when k'=k.

The above described adaptive turbo detection scheme has been tested by field trial data collected in the SPACE08 undersea experiment, conducted off the coast of Martha's Vineyard, Edgartown, Mass., in October 2008. The water depth of this sea trial was about 15 m. On the transmitter side, four transducers numbered 0 through 3 were deployed. Transducer 0 was fixed on a stationary tripod about 4 m above the ocean bottom. Transducers 1-3 were evenly mounted on a vertical array with 50 centimeters spacing, and the top transducer in the array was about 3 m above the ocean bottom. Six hydrophone arrays placed at different locations were deployed for signal reception, with detailed information given in FIG. 5. The communication distances were 60 m, 200 m, and 1000 m. The top hydrophone of each array was approximately 3.3 m above the sea bottom.

For MIMO transmission, the horizontal encoding (HE) scheme with BICM in time domain was adopted at the transmitter, as shown in FIG. 1. The channel coding was a rate $R_c=1/2$ convolutional code with generator polynomial in octal notation. The modulations include QPSK, 8PSK, and 16QAM. The transmission power for all modulation schemes were the same, so detection becomes more difficult when the modulation level increases. The carrier frequency was $f_c=13$ kHz and the symbol rate was 9.77 kilo symbol per second (ksps). A square-root raised cosine filter with a roll-off factor of 0.2 was used for pulse shaping, leading to the occupied channel bandwidth of about 11.72 kHz. At the receiver side, the passband sampling rate was 39.0625 kHz.

Figure 6:
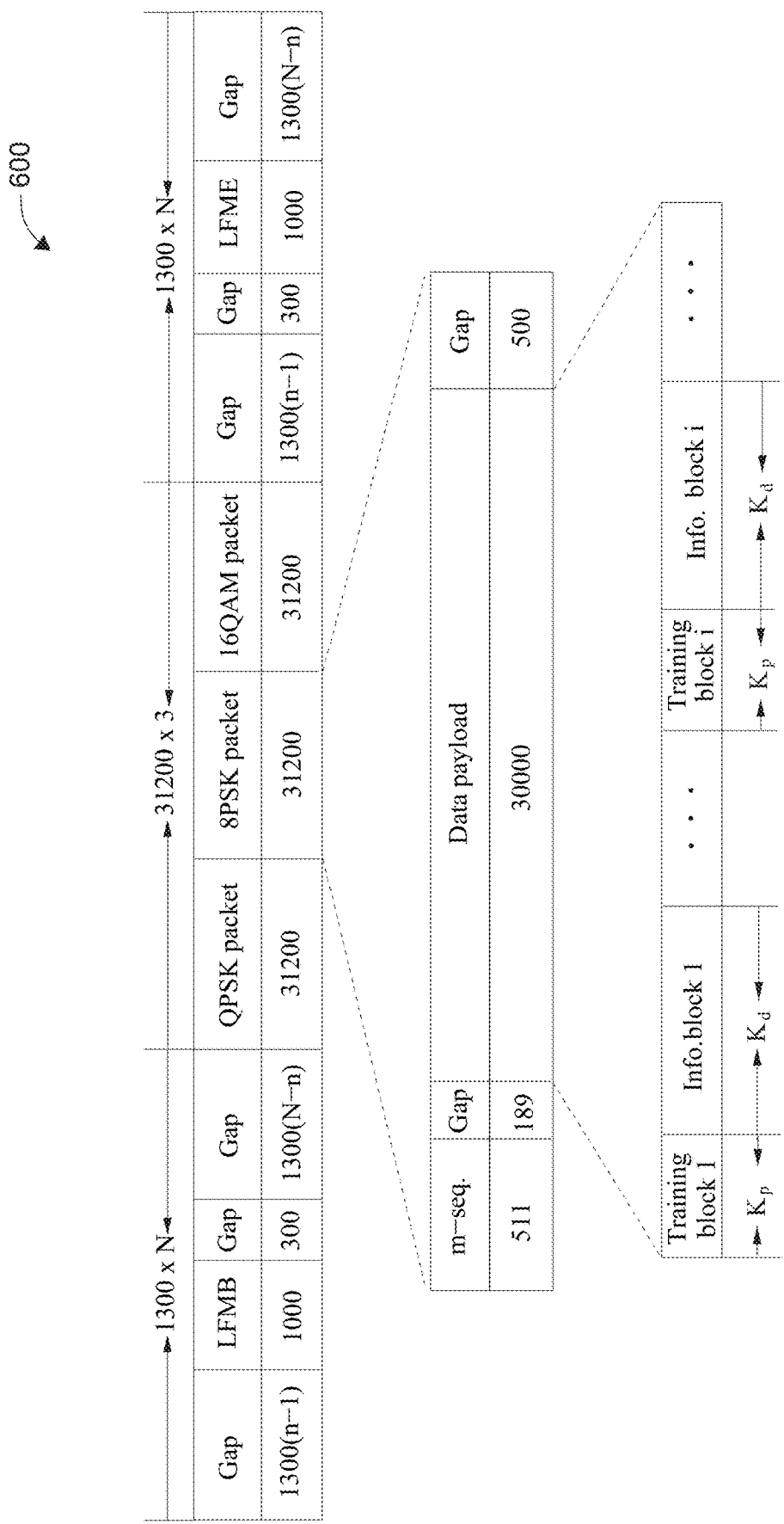
FIG. 6 depicts the burst scheme of the nth transmit branch in the SPACE08 undersea experiment used for a test of aspects hereof.

The signal format at the n-th transducer is illustrated in FIG. 6, where the transmit burst starts with a header linear frequency modulation ("LFM") signal named LFMB and ends with a trailing LFM signal named LFME. The LFM signals are used for coarse synchronization and channel structure measurement. Note these LFM signals are transmitted with different transducers at different time slots to avoid the co-channel interference in synchronization. Following the header LFM signal are three data packets with QPSK, 8PSK, and 16QAM modulations, each starts with an m-sequence of length 511 for Doppler shift estimation, followed by a data payload consisting of 30,000 symbols. The use of long data payload improves the transmission efficiency. Gaps are inserted in the transmission burst, and they can be used for estimating the noise power. With the estimated noise power, the signal-to-noise ratio ("SNR") can also be evaluated. For the SPACE08 experiment, the typical SNR estimation is in the range of 20 dB to 32 dB.

Figure 7:
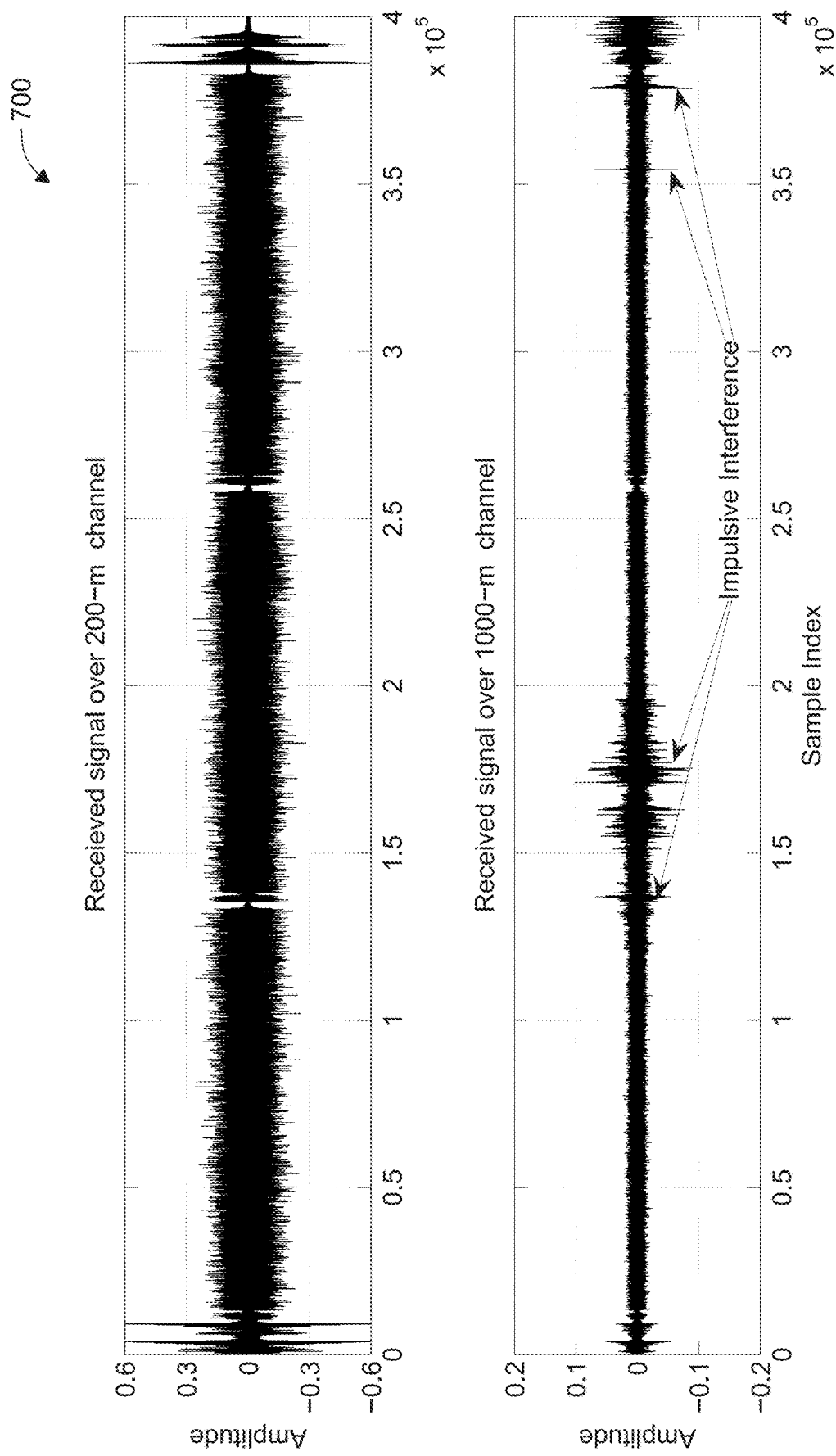
FIG. 7 depicts exemplary received signals used for a test of aspects hereof.

The received bursts of the 200-m channel and the 1000-m channel are shown in FIG. 7. The strength of the 200-m signal (peak-to-peak amplitude of 0.38) is much stronger than the 1000-m signal (peak-to-peak amplitude of 0.038), which is reasonable since the acoustic signal attenuates with distance. In addition, impulsive interference is observed in the 1000-m signal.

Figure 8B:
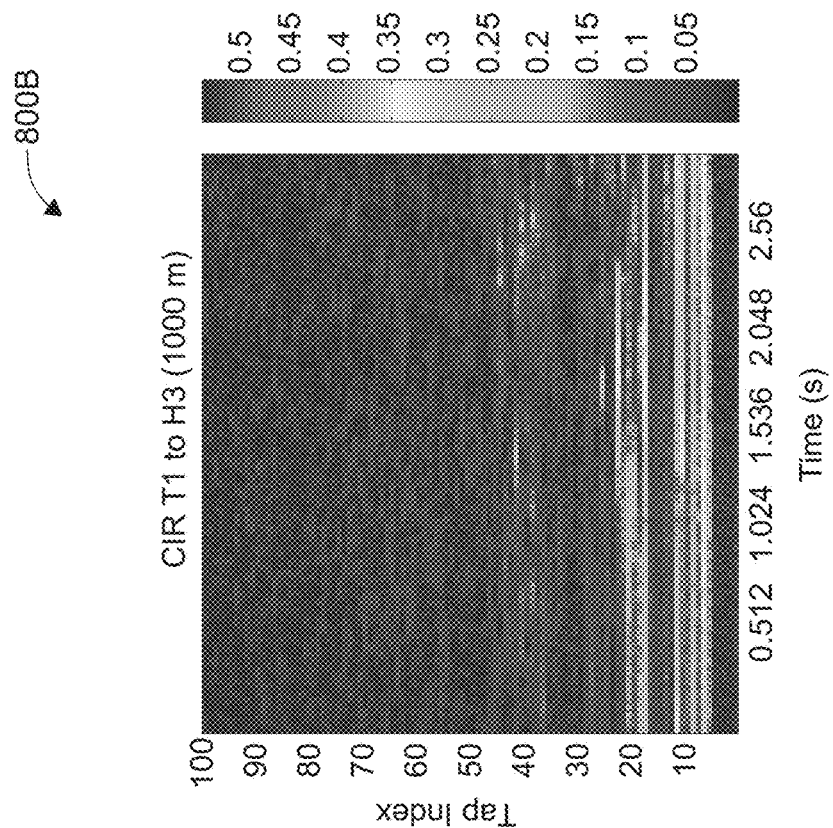
FIG. 8B depicts an exemplary channel impulse response over a period of time used for a test of aspects hereof.
Figure 8A:
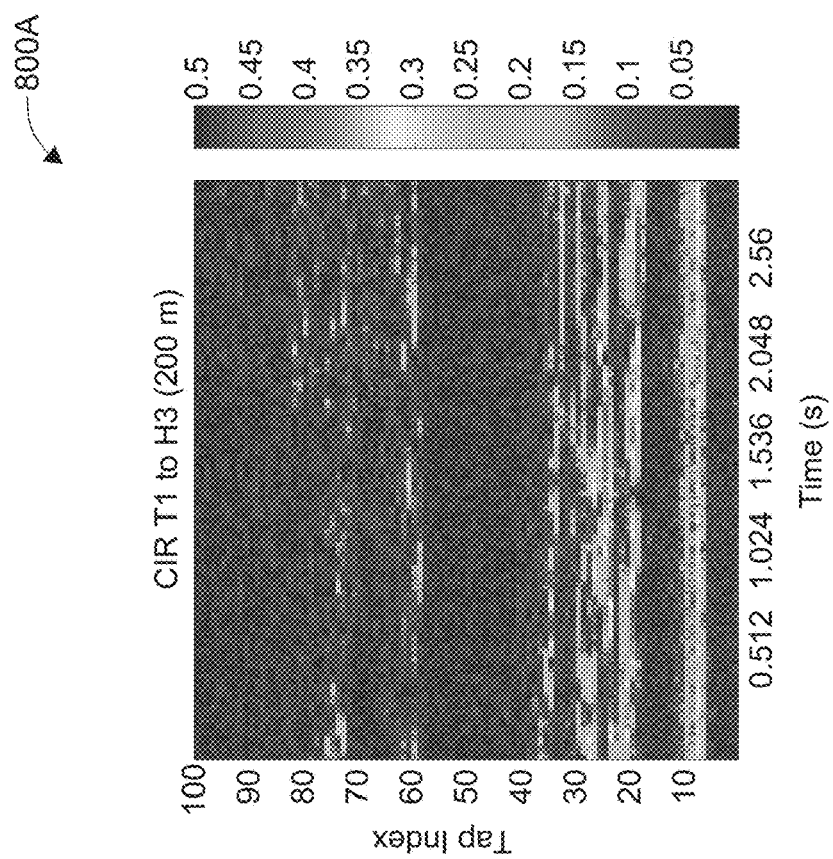
FIG. 8A depicts an exemplary channel impulse response over a period of time used for a test of aspects hereof.

Turning to FIGS. 8A and 8B, the channel impulse response ("CIR") measured in the experiment is shown for both the 200-m transmission and the 1000-m transmission, where "T#" and "H#" denote the indices of the transducer and the hydrophone, respectively. The following observations are made: first, the multipath energy spread over a time window of 10 ms, corresponding to a channel length of 100 coefficients in terms of the symbol period $T_s=0.1024$ ms; second, the channels are non-minimum phase as the strongest multipath component is not at the very beginning of the CIR, which add to the difficulty for equalization; third, the channel is fast time-varying, especially for the 200-m channel, making the adaptive symbol detection quite challenging.

Due to the fast time variations of the UWA channels, the adaptive turbo detector partitions each long data payload into multiple blocks of size $K_b$ for processing, as shown in FIG. 5. For each partition block, the first $K_p$ symbols are used as the training symbols to initialize the adaptive receiver, and the remaining $K_d$ symbols carry information bits. The resulting training overhead is $\xi=K_p/(K_p+K_d)$ and the corresponding information rate is $9.77\times\xi qNR_c$ kilo bits per second. In the data processing, $K_p$ is fixed as 500 and the choice of $K_d$ is flexible depending on the modulation and the MIMO size. Referring to FIG. 9, the choice of the training overheads (equivalent to the choice of $K_b$, since $K_p$ is fixed) and the corresponding information rates are summarized, for different combinations of modulation and MIMO size.

The step size $\mu$ of the adaptive algorithms was set to be exponentially decaying with each data reuse iteration, and the decaying factor was set as $\beta=0.9$. The initial step size was chosen as $\mu=1$ during the training period, and decreased to $\mu=0.1$ at the DD mode. The choices of $K_1=100$, $K_2=50$ and $K_3=K_4=50$ are used for the feedforward filter and the SIC filter, respectively, in this particular experiment. The maximum number of equalizer iterations (or data reuse) was set as 4. Other relevant parameters in the adaptive algorithm were set as $\delta_{NLMS}=0.01$, $\delta_{IPNLMS}=5\times10^{-5}$, $\in=0.01$, and $\alpha=0$.

The results for the 200-m and 1000-m transmissions are presented. For the 200-m transmission, 30 S3 files and 15 S4 files described in Table I were recorded in two days during the experiment. Each file contains one burst as shown above, and all 45 files were processed. For the 1000-m transmission, 34 data files were recorded during the trial but only 19 of them are valid. The 19 valid files, including eight S5 files and eleven S6 files, were all processed.

The processing of the two-transducer MIMO data will now be discussed. Table III provides a summary of the results, and the figure of merit is the number of packets achieving a specific BER level. From FIG. 10, the following observations are made: first, the effectiveness of the turbo equalization is clearly shown, as the detection performance increases with the number of turbo iterations; second, the proposed SD-ATEQ with either NLMS or IPNLMS manifests fast convergence, since most packets achieve the specified BER performance within 3~4 turbo iterations; third, the IPNLMS-based SD-ATEQ exhibits better performance than the NLMS-based SD-ATEQ, and the performance gain tends to increase with the modulation level. With QPSK or 8PSK modulations, the NLMS achieves comparable performance to the IPNLMS while at lower complexity, thus NLMS is a desired choice for practical use. With 16QAM modulation, however, the IPNLMS achieves considerable performance gain over the NLMS.

Figure 11A:
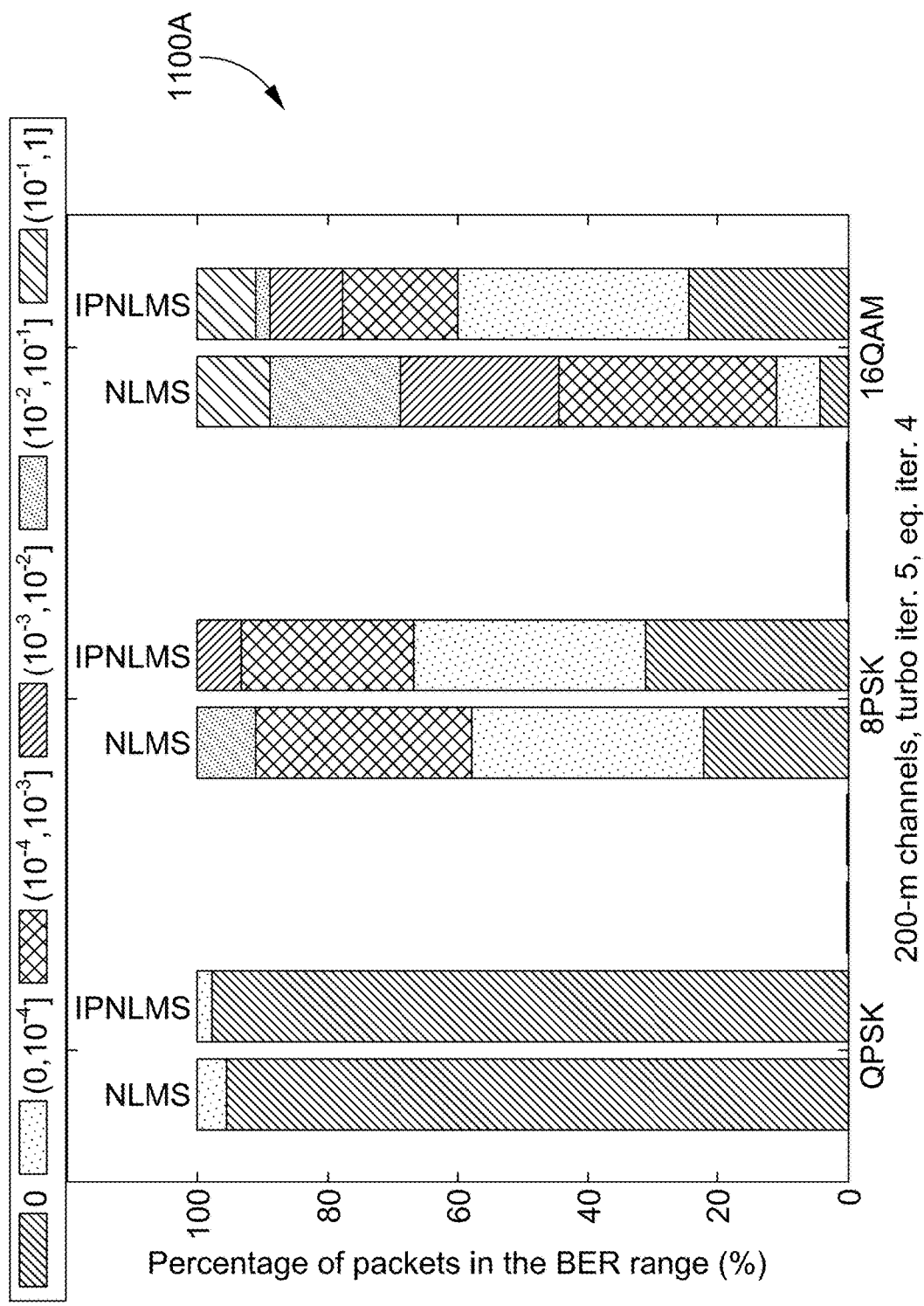
FIG. 11A depicts a plot of results of two-transducer MIMO transmission after 5 turbo iterations in a 200-m channel obtained from a test of aspects hereof.
Figure 11B:
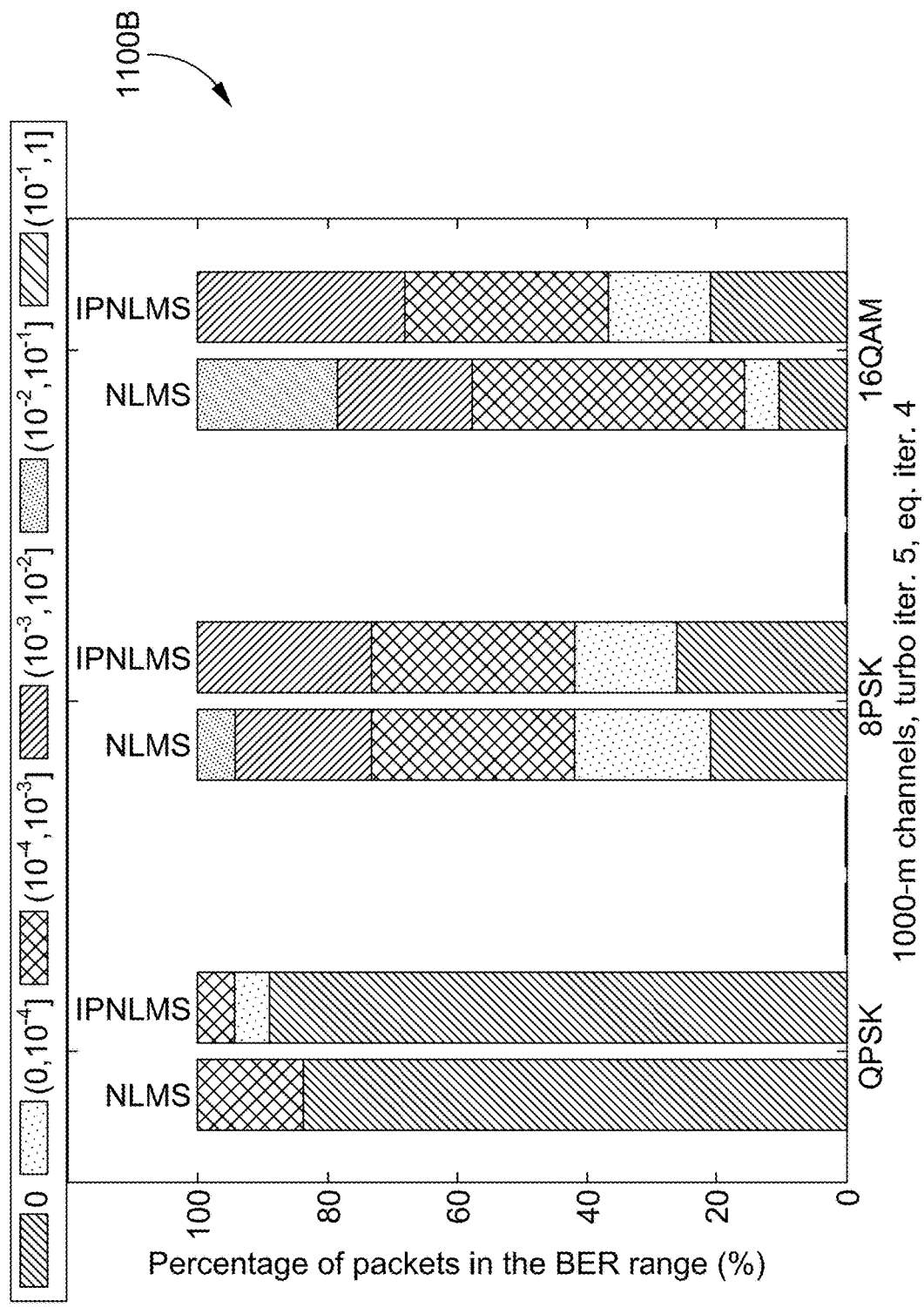
FIG. 11B depicts a plot of results of two-transducer MIMO transmission after 5 turbo iterations in a 1000-m channel obtained from a test of aspects hereof.

FIGS. 11A and 11B provides a graphical presentation of the final detection results (after five turbo iterations) in FIG. 10, where different shaded bars correspond to the specified BER ranges. For the QPSK modulation, the NLMS and the IPNLMS achieve similar performance for both the 200-m and the 1000-m transmissions. For the 8PSK modulation, the IPNLMS is slightly better than the NLMS. With the 16QAM modulation, however, the performance gap between the NLMS and IPNLMS is substantial. For example, the 200-m result shows the percentage of the packets with BER<$10^{-4}$ increases from 11.1% for the NLMS to 60% for the IPNLMS after five turbo iterations.

Figure 12:
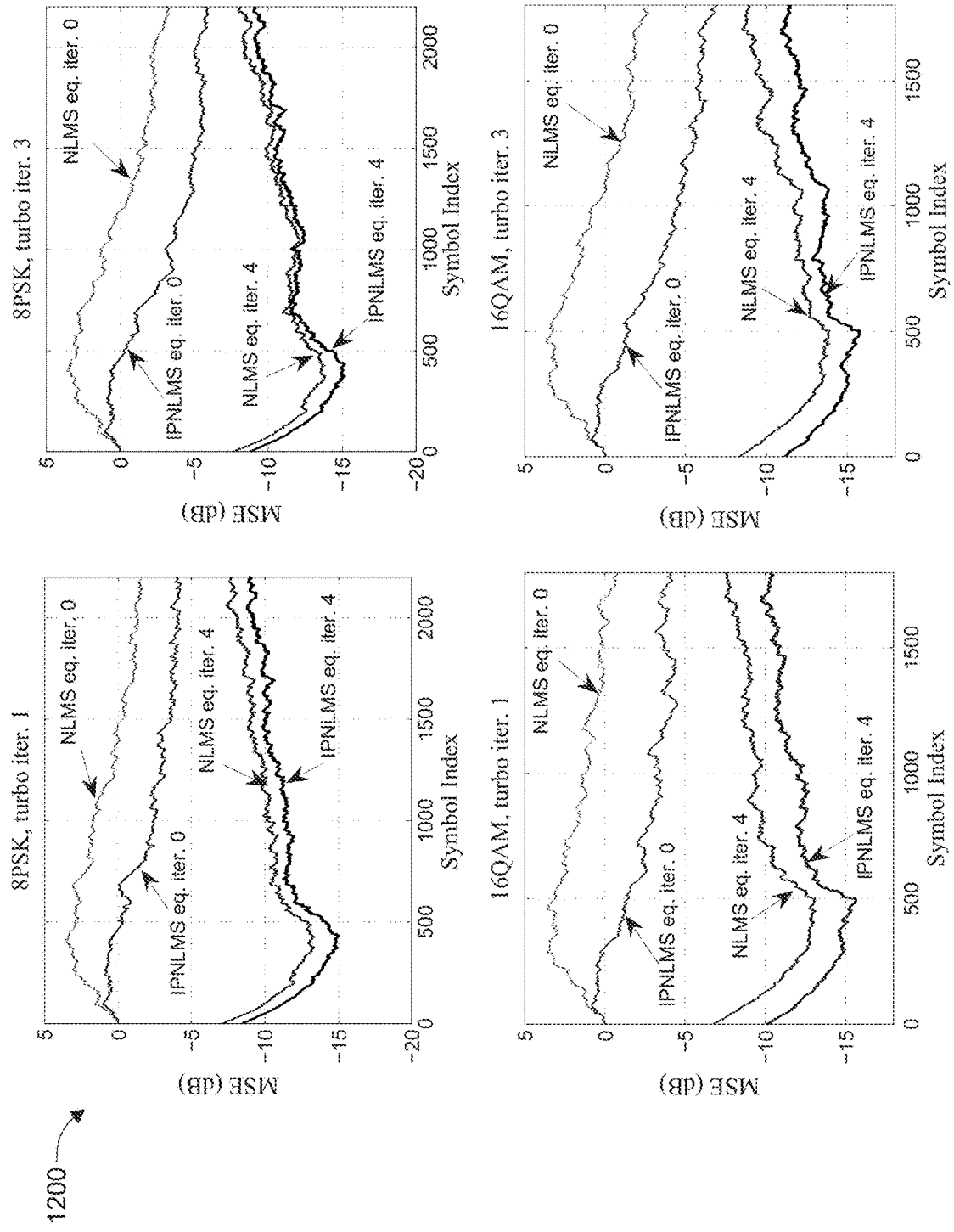
FIG. 12 depicts plots of MSE curves of 2×6 MIMO detection with 8PSK and 16QAM modulation in a 200-m channel obtained from a test of aspect hereof.

Performance analysis is provided for the proposed adaptive equalization via the mean square error ("MSE") curve. For a given turbo iteration, the MSE of the n-th transmit stream at the (t+1)-th equalizer iteration is estimated via a leaky integrator as $$\text{MSE}_{n,k+1}^{t+1}=\lambda\text{MSE}_{n,k}^{t+1}+(1-\lambda)|e_{n,k}^{t+1}|^2 \quad (26)$$

where $k=1,\ldots,K_b$, $e_{n,k}^{t+1}=\check{x}_{n,k}^t-\hat{x}_{n,k}^{t+1}$ and $\lambda$ is set as 0.99. It is noted that $\text{MSE}_{n,1}^{t+1}=\text{MSE}_{n,K_b+1}^{t}$, $e_{n,k}^0=Q(\hat{x}_{n,k}^0)-\hat{x}_{n,k}^0$ when $N_{iter}=0$, and $e_{n,k}^0=\check{x}_{n,k}-\hat{x}_{n,k}^0$ when $N_{iter}>0$. In FIG. 12, the MSE curves obtained in the detection of 200-m 2×6 MIMO packet with 8PSK and 16QAM modulations are presented, for the first and the third turbo iteration. The MSE gaps between the NLMS and the IPNLMS tend to decrease with the number of equalizer iterations. Even for the 16QAM modulation, there is still non-negligible 2 dB difference between the IPNLMS and the NLMS, after multiple equalizer iterations. This observation matches the BER results shown in FIG. 10.

Figure 13:
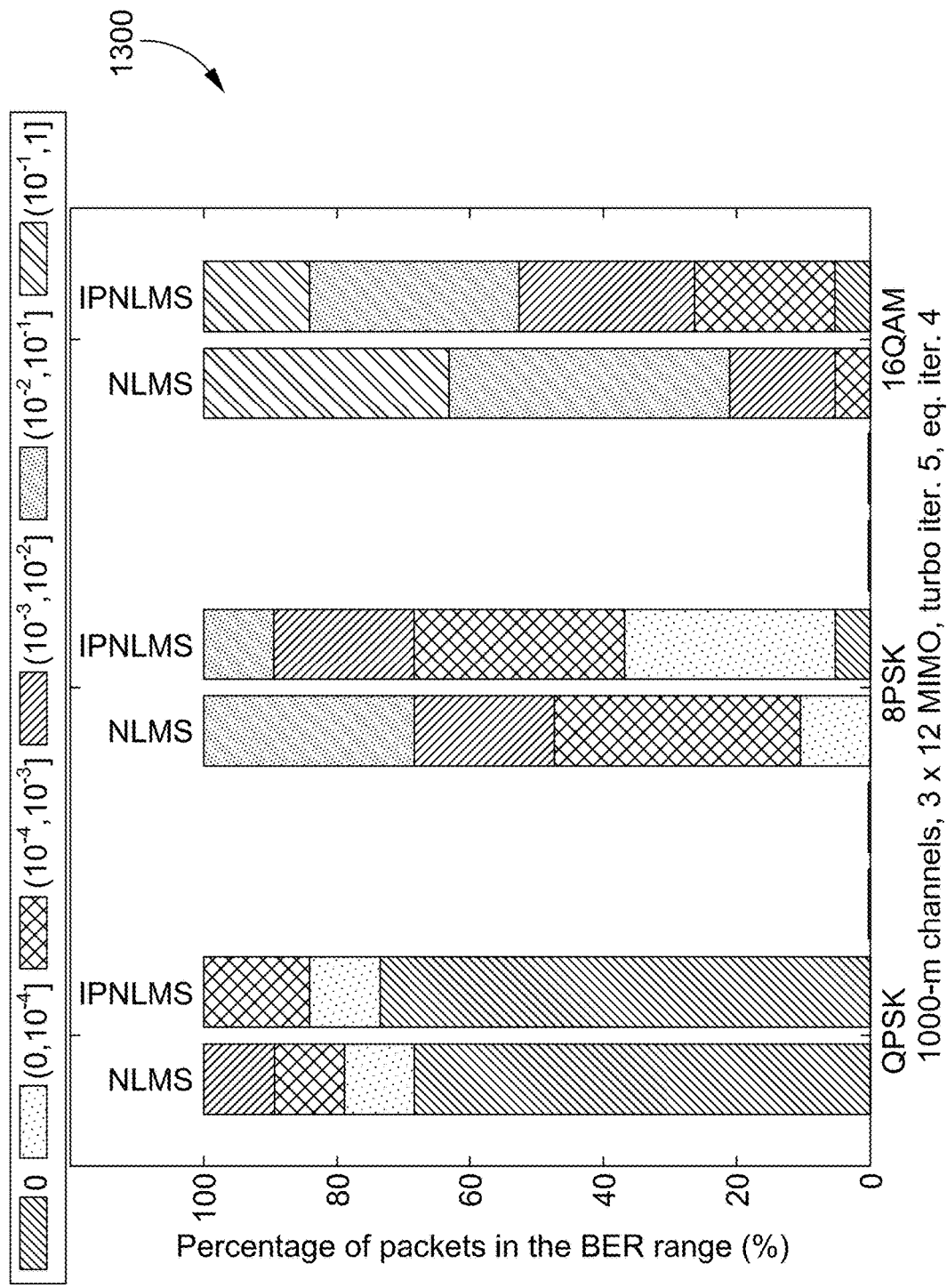
FIG. 13 depicts a plot of results of 3×12 MIMO transmission after 5 turbo iterations in a 1000-m channel obtained from a test of aspects hereof.

The processing results for 3×12 and 4×12 MIMO transmission will now be discussed. Compared with the two-transducer transmission, detection gets more difficult with more concurrent transmission streams, due to the increased co-channel interference. In FIG. 13, the 3×12 results of the 1000-m transmission are presented. With a 22.73% training overhead, both the NLMS and the IPNLMS based SD-ATEQs detected successfully most QPSK packets with BER<$10^{-4}$. Specifically, with the IPNLMS algorithm, 84.2% of the packets achieve BER<$10^{-4}$ and the remaining packets have the BER<$10^{-3}$. As to the 8PSK packets, 89.5% of them achieve satisfactory performance with BER<$10^{-2}$ with the IPNLMS algorithm, at a 27.78% training overhead. The training overhead for the 16QAM modulation was increased to 33.3%. With the IPNLMS-based SD-ATEQ, 52.6% 16QAM packets achieve the BER<$10^{-2}$, and 31.6% packets reach the BER level of $10^{-2}$.

Figure 14:
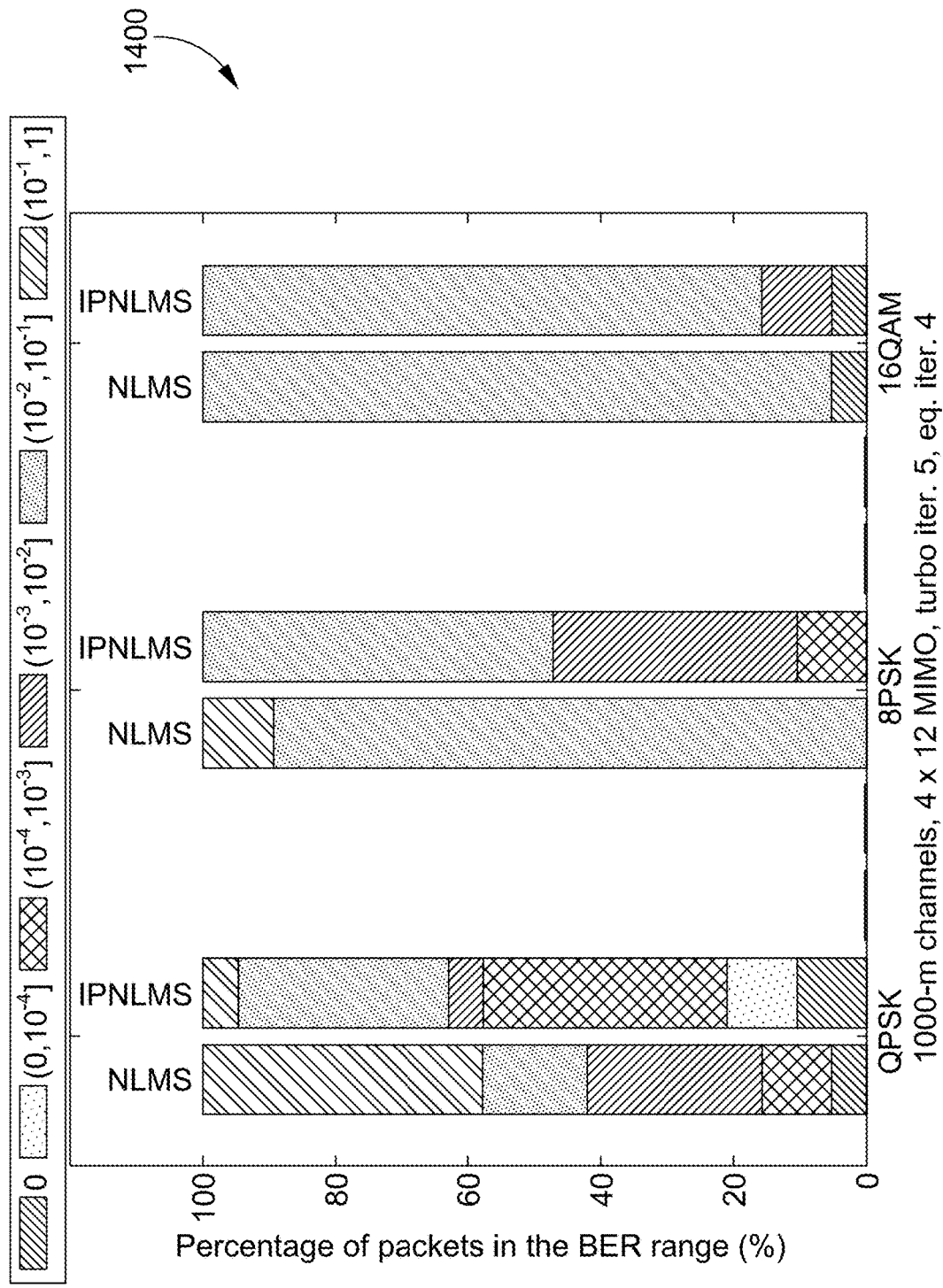
FIG. 14 depicts a plot of results of 4×12 MIMO transmission after 5 turbo iterations in a 1000-m channel obtained from a test of aspects hereof.

The results of the 4×12 MIMO transmission are shown in FIG. 14, where the training overheads have been increased to 27.78%, 41.76% and 47.6% for QPSK, 8PSK, and 16QAM, respectively. For QPSK modulation, the IPNLMS algorithm achieves satisfactory performance. Specifically, 57.9% QPSK packets achieve satisfactory performance with BER<$10^{-3}$, and only one packet fails with BER>$10^{-1}$. The detection results for 8PSK and 16QAM modulations, are not as successful as those for the QPSK modulation, even when a higher training overhead was used. A closer look at the detection results reveals the performance bottleneck lies in the third transmit stream, whose signal strength is relatively weak on the receive side.

Figure 15B:
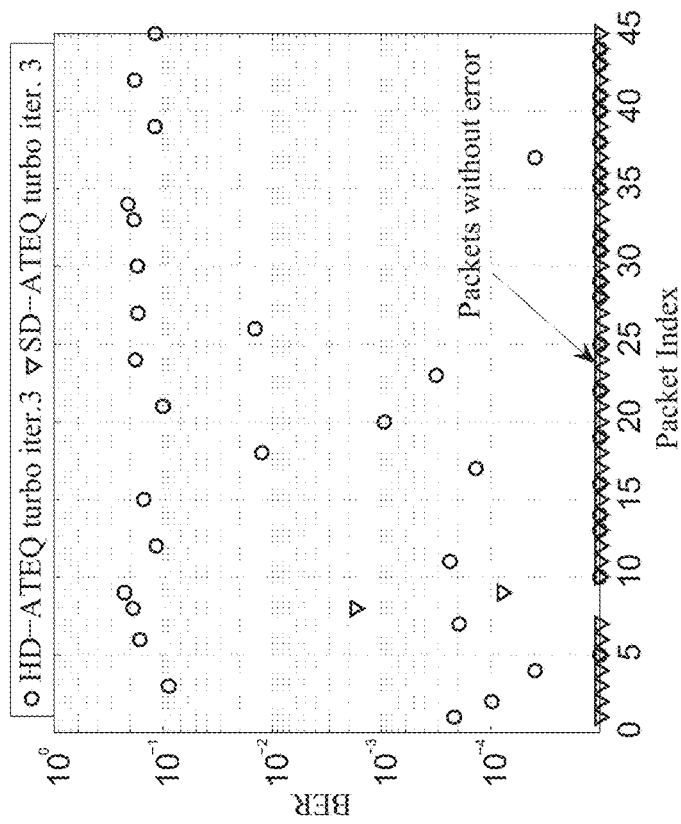
FIG. 15B depicts a plot of bit-error-rate of both SD-ATEQ and HD-ATEQ for 2×6 MIMO transmission in a 200-m channel after 3 turbo iterations obtained from a test of aspects hereof.
Figure 15A:
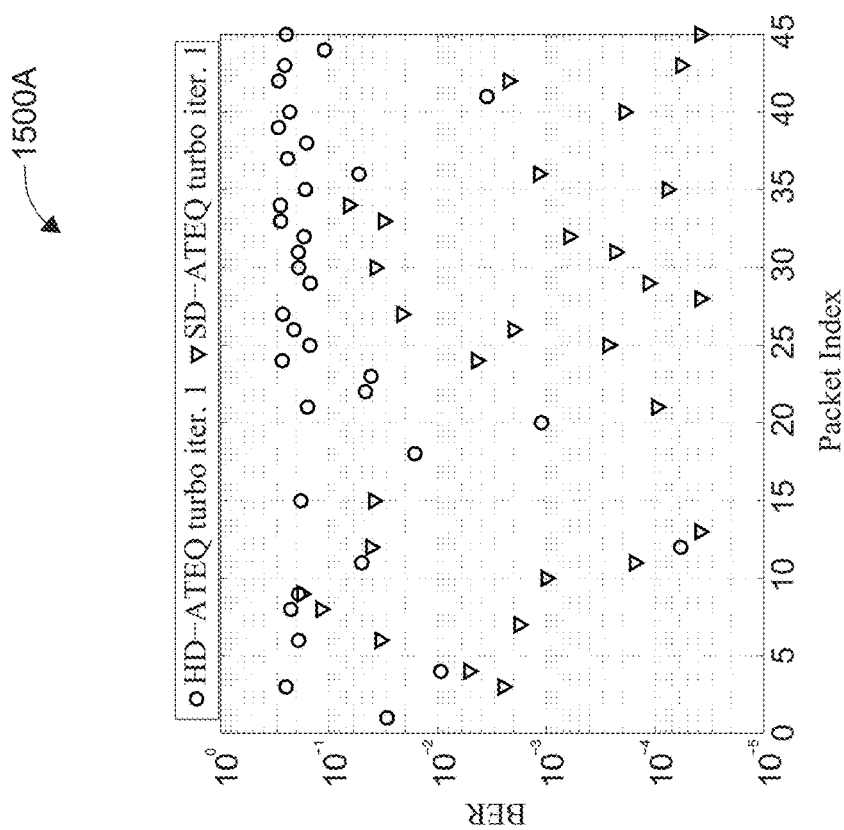
FIG. 15A depicts a plot of bit-error-rate of both SD-ATEQ and HD-ATEQ for 2×6 MIMO transmission in a 200-m channel after 1 turbo iteration obtained from a test of aspects hereof.

It is found that the HD-ATEQ experienced convergence issues in the processing of 8PSK and 16QAM packets, due to the catastrophic effect of error propagation. Even with QPSK modulation, the NLMS-based HD-ATEQ did not converge. Therefore, the comparison between the proposed SD-ATEQ and the HD-ATEQ is limited to the two-transducer MIMO transmission with QPSK modulation and the IPNLMS algorithm. The comparison is shown in FIGS. 15A and 15B for the 200-m transmission. Note that FIGS. 15A and 15B have the packets without error plotted on the line of BER=$10^{-5}$ for better observation. The SD-ATEQ outperforms the HD-ATEQ dramatically. After three turbo iterations, 43 packets achieve zero BER with the SD-ATEQ. In comparison, when the HD-ATEQ is used the detection still fails for 15 packets with BER larger than $10^{-1}$.

Figure 16A:
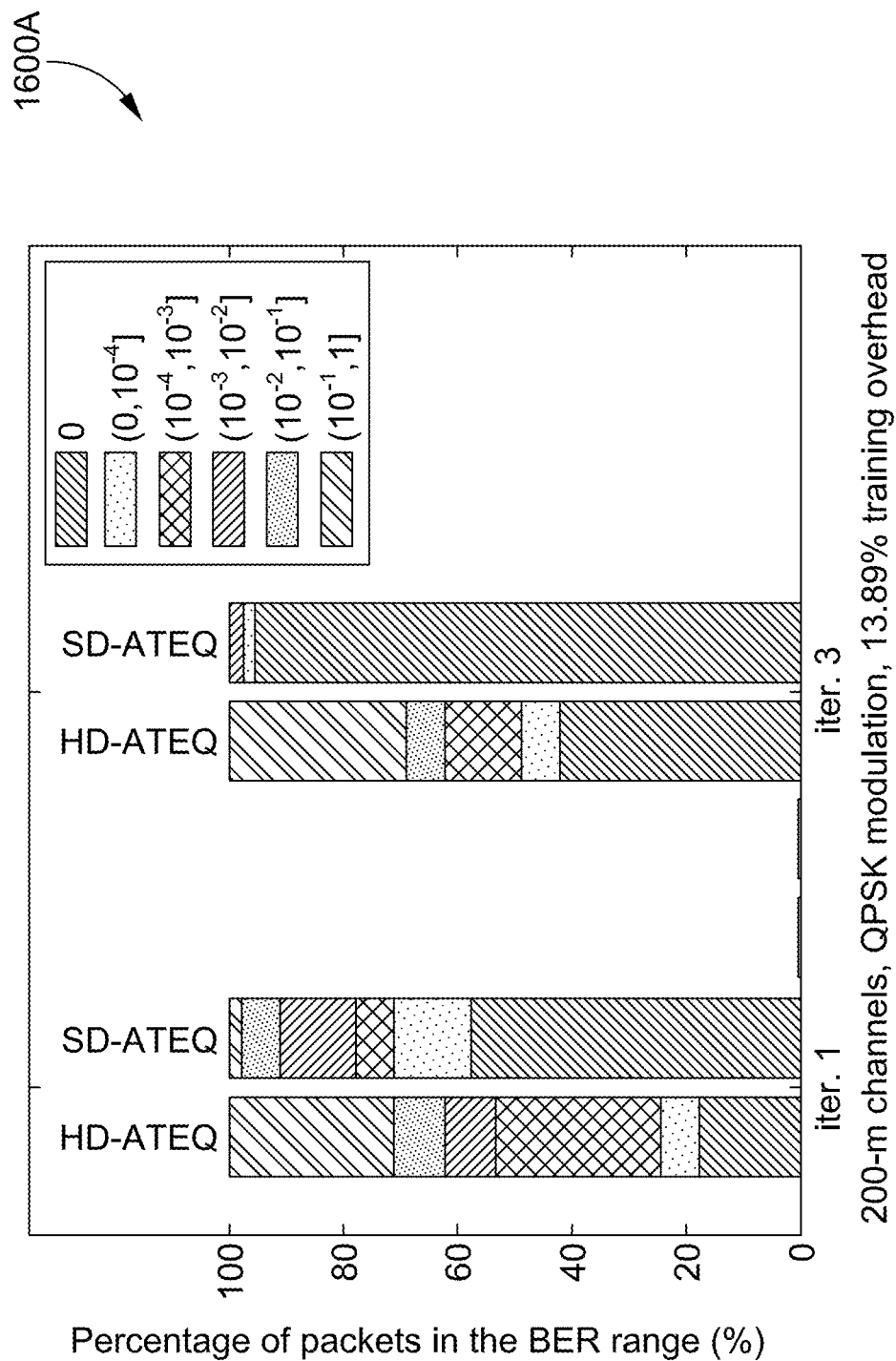
FIG. 16A depicts a plot of detection results of 200-m transmissions compared in terms of different bit-error-rate ranges after 1 turbo iteration and after 3 turbo iterations obtained from a test of aspects hereof.
Figure 16B:
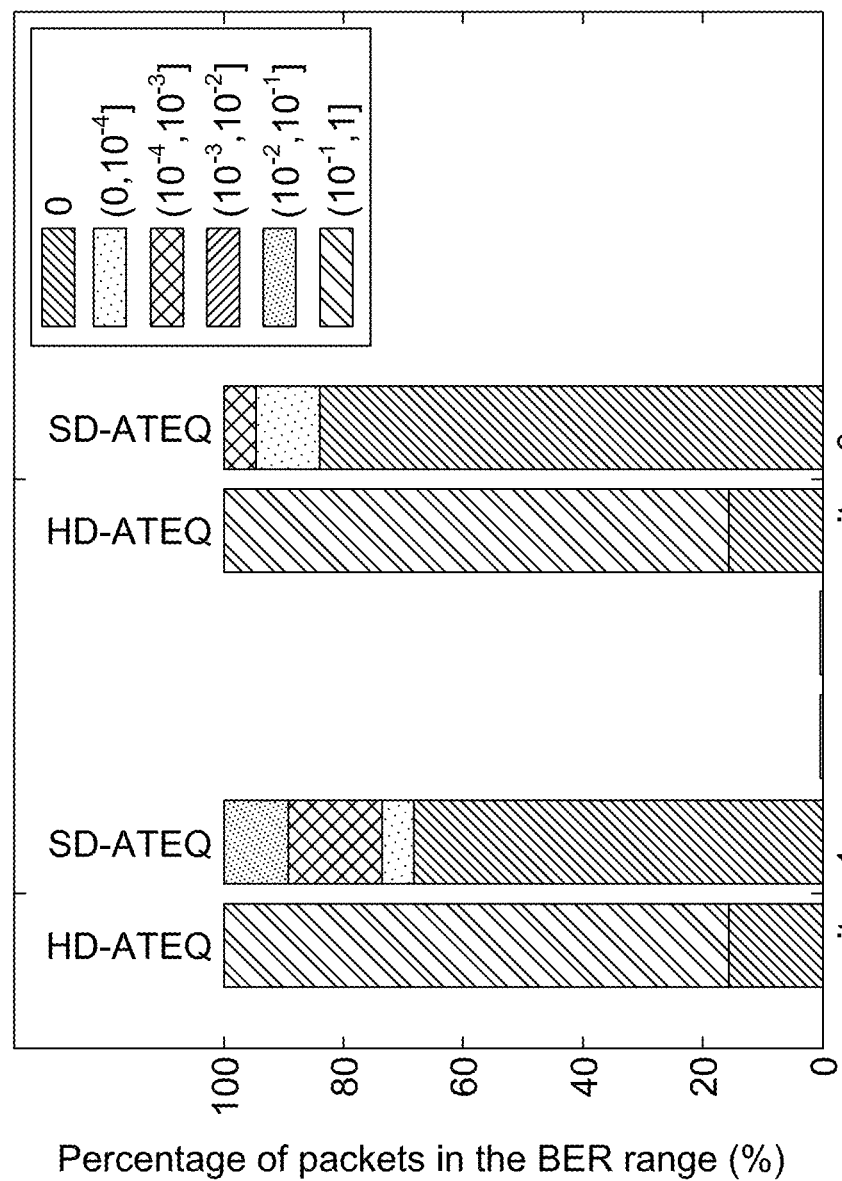
FIG. 16B depicts a plot of detection results of 1000-m transmissions compared in terms of different bit-error-rate ranges after 1 turbo iteration and after 3 turbo iterations obtained from a test of aspects hereof.

In FIGS. 16A and 16B, the detection results of the 200-m and the 1000-m transmissions are compared in terms of the percentages of different BER ranges. After one turbo iteration, 71.1% and 73.3% of packets achieve BER<$10^{-4}$ for the 200-m channel and the 1000-m channel, respectively, with the proposed SD-ATEQ. With three turbo iterations, the SD-ATEQ successfully detected 97.8% 200-m packets and 94.8% 1000-m packets with BER<$10^{-4}$ (most of these packets achieved zero BER). With the HD-ATEQ, however, 31.1% 200-m packets and 84.2% 1000-m packets still failed with BER>$10^{-1}$. This comparison again demonstrates the superiority of the proposed SD-ATEQ over the HD-ATEQ.

Figure 17:
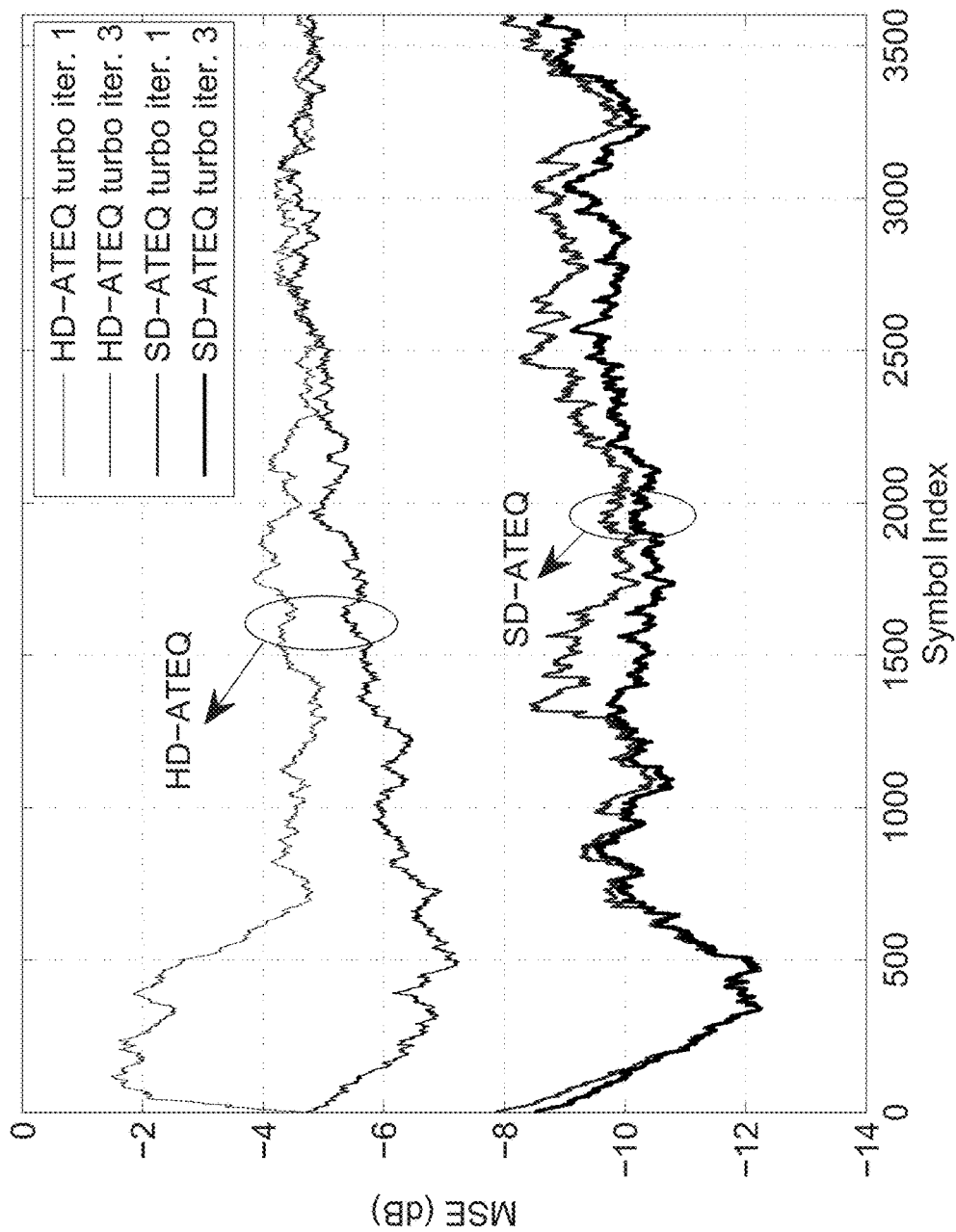
FIG. 17 depicts a plot of MSE versus symbol index using both SD-ATEQ and HD-ATEQ for 2×6 transmission in a 200-m channel obtained from a test of aspects hereof.

Finally, the comparison in terms of MSE is presented in FIG. 17. From the figure, the difference in MSE between the proposed SD-ATEQ and the HD-ATEQ can be more than 5 dB. Further, the SD-ATEQ converges faster than the HD-ATEQ, as shown by the gap between the first and the third turbo iteration.

Figure 18:
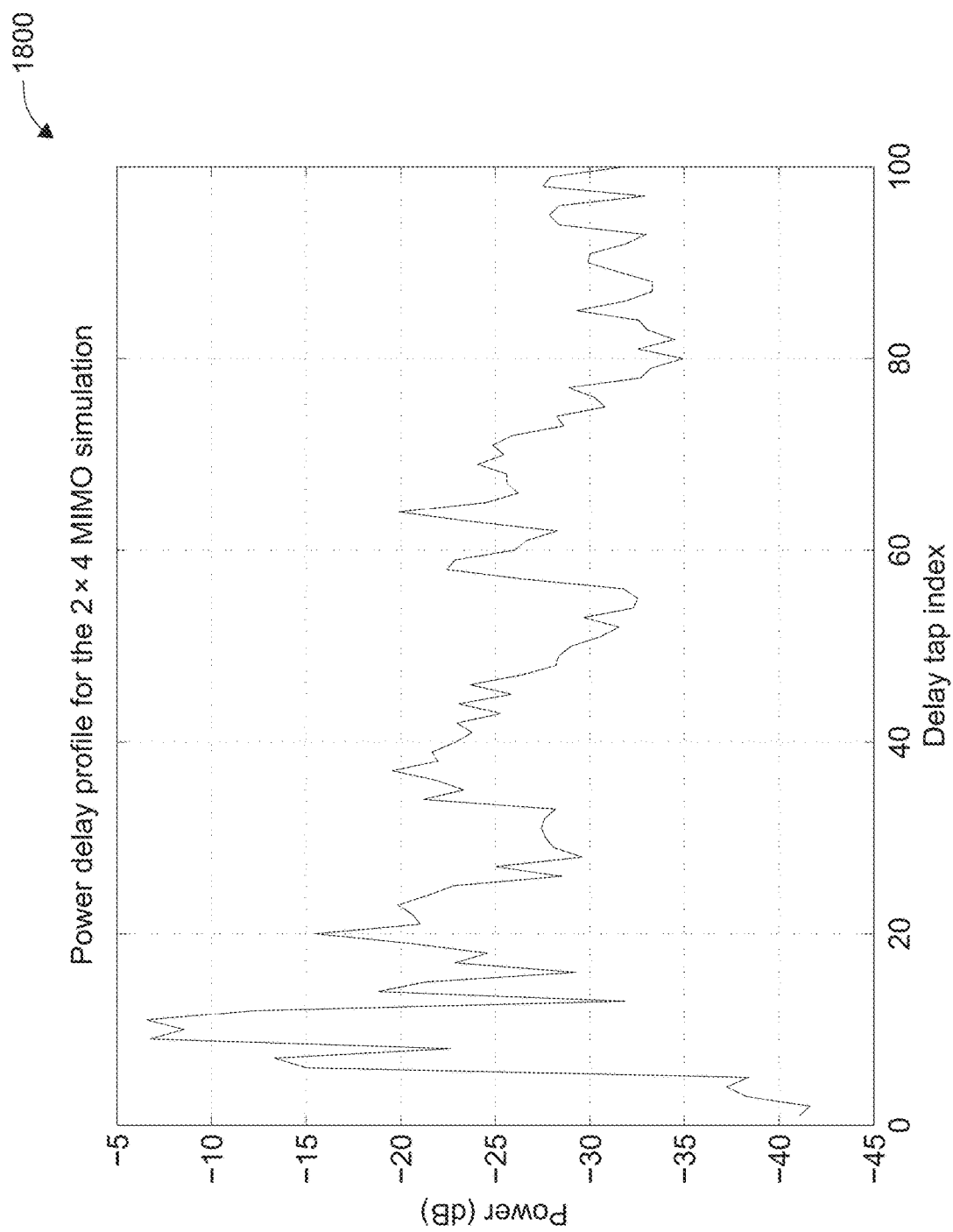
FIG. 18 depicts a plot of estimated power delay profile used in a test of aspects hereof.

We also compared the performance of the proposed SD-ATEQ with the HD-ATEQ based on simulations. In one simulation, a 2×4 MIMO system with QPSK modulation was used, where each sub-channel is a frequency selective Raleigh fading channel. The fading channels are generated with the power delay profile described in FIG. 18, which is estimated from the experimental channels. The rate 1/2 convolutional code with generator polynomial in octal notation is used in the simulation. The data payload partition scheme is the same as one in the experiment and the training overhead is set as 20%. The normalized Doppler frequency is chosen as $1.28 \times 10^{-4}$, which corresponds to the maximum doppler shift (5 Hz) estimated from experimental data.

Figure 19B:
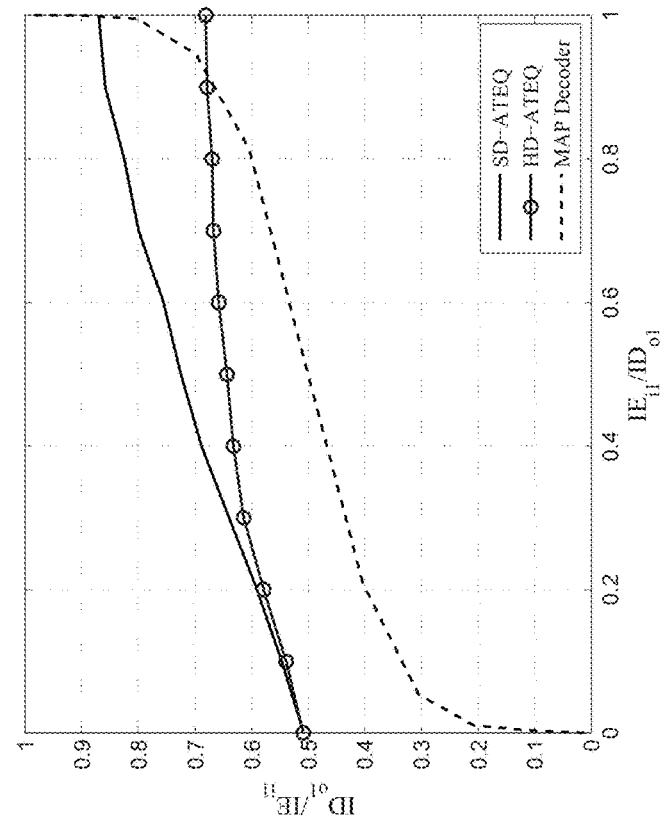
FIG. 19B depicts a plot of extrinsic-information-transfer simulation results of SD-ATEQ and HD-ATEQ in 2×4 MIMO channels with QPKS modulation used in a test of aspects hereof.
Figure 19A:
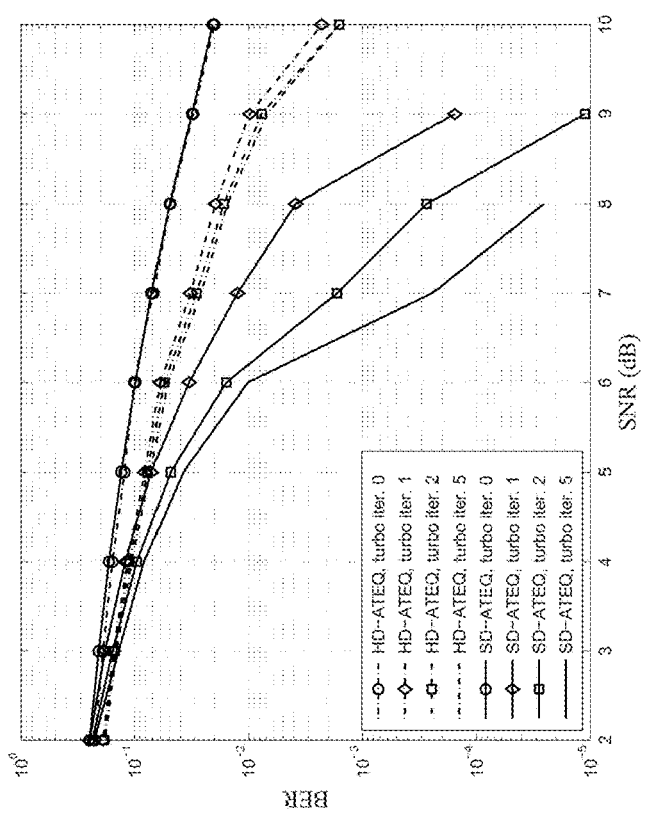
FIG. 19A depicts a plot of bit-error-rate simulation results of SD-ATEQ and HD-ATEQ in 2×4 MIMO channels with QPKS modulation used in a test of aspects hereof.

The BER and extrinsic information transfer chart ("EXIT") simulation results are shown in FIGS. 19A and 19B. The SD-ATEQ outperforms the HD-ATEQ, which is consistent with the above described experiment results. From both the BER and EXIT curves, early convergence of the HD-ATEQ is seen in the tough, time-varying MIMO channels, which is also observed in the experimental data discussed above.

Figure 20:
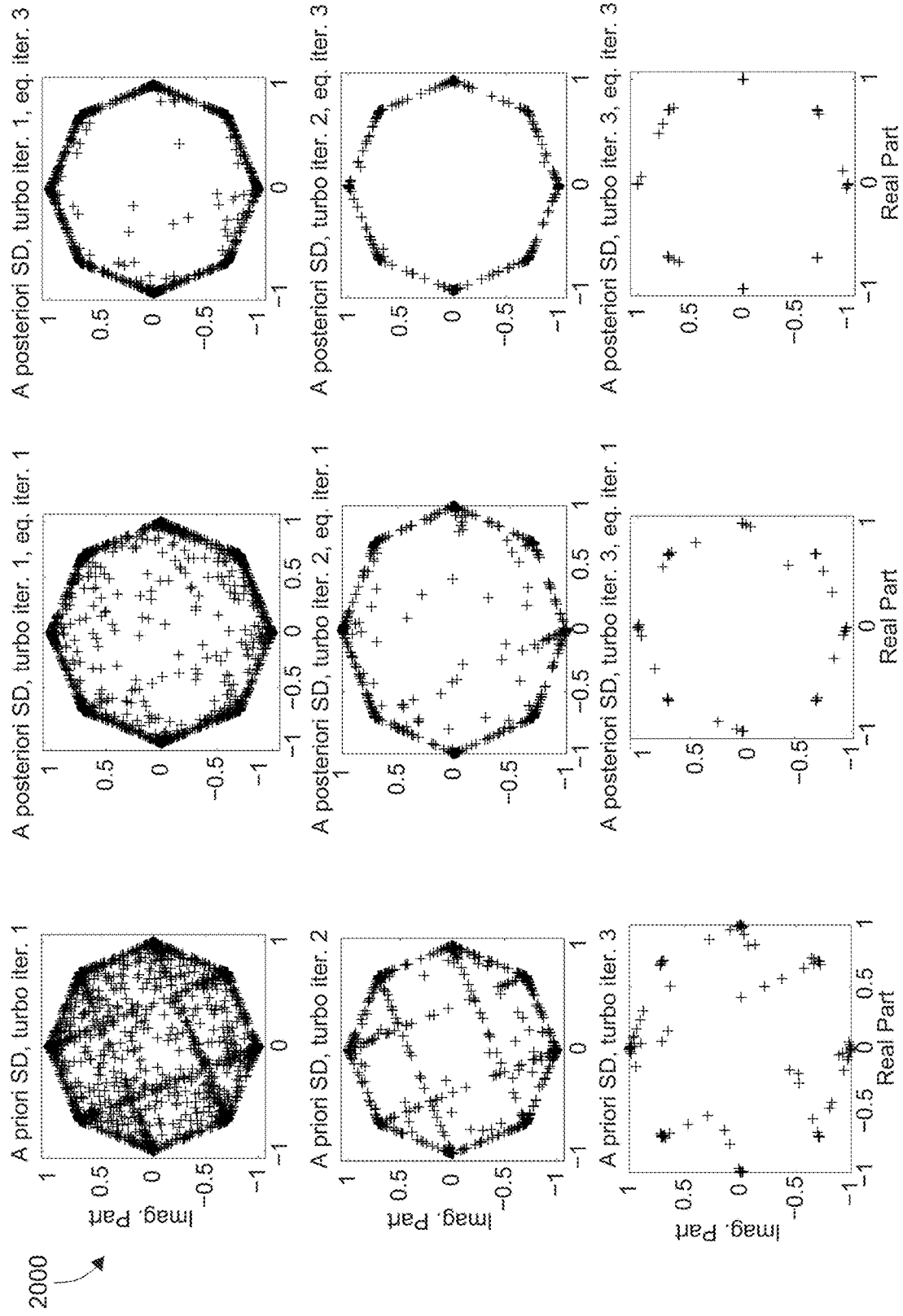
FIG. 20 depicts plots of exemplary evolution of soft decisions obtained from a test of aspects hereof.

The evolutional behavior of the SD-ATEQ will now be discussed. In FIG. 20, the quality evolution of the soft decisions is shown using 8PSK packet as an example. Each row shows the quality evolution at different equalizer iterations for a given turbo iteration, and each column demonstrates the quality evolution at different turbo iterations for a given equalizer iteration. The quality of the soft decisions increases with the number of equalizer iterations and the number of turbo iterations, as expected. It is also clearly shown that the a posteriori soft decisions provide better fidelity than the a priori soft decisions due to the extra information gleaned over the equalizer iterations.

Figure 21:
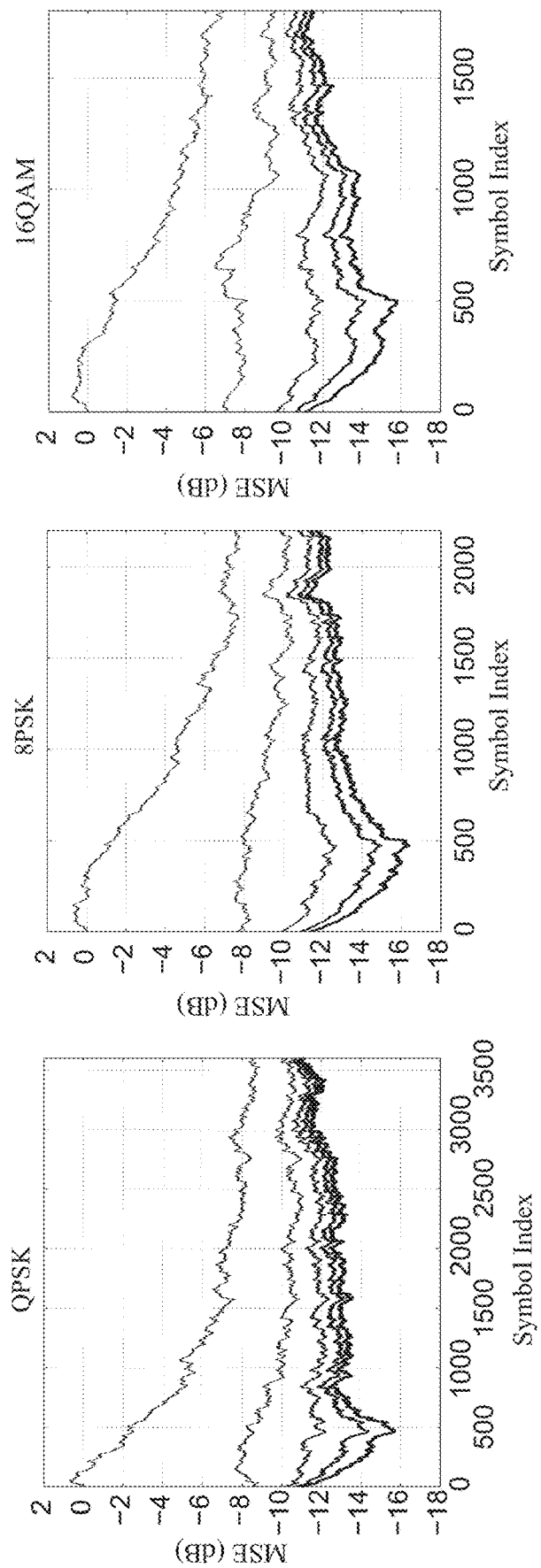
FIG. 21 depicts plots of MSE evolution of the IPNLMS-based SD-ATEQ obtained from a test of aspects hereof.

In FIG. 21, the evolutional behavior of the IPNLMS-based SD-ATEQ is demonstrated using MSE. For each subfigure, the number of turbo iterations is fixed as 3, and the number of equalizer iterations varies from 0 to 4. The MSE decreases consistently with the increase in the equalizer iterations, regardless of the modulation. With 4 equalizer iterations, the performance gain achieved can be up to 14 dB and 6 dB during the training phase and the DD phase, respectively. The results with the NLMS-based SD-ATEQ are very similar and are thus omitted for the sake of brevity.

Figure 22:
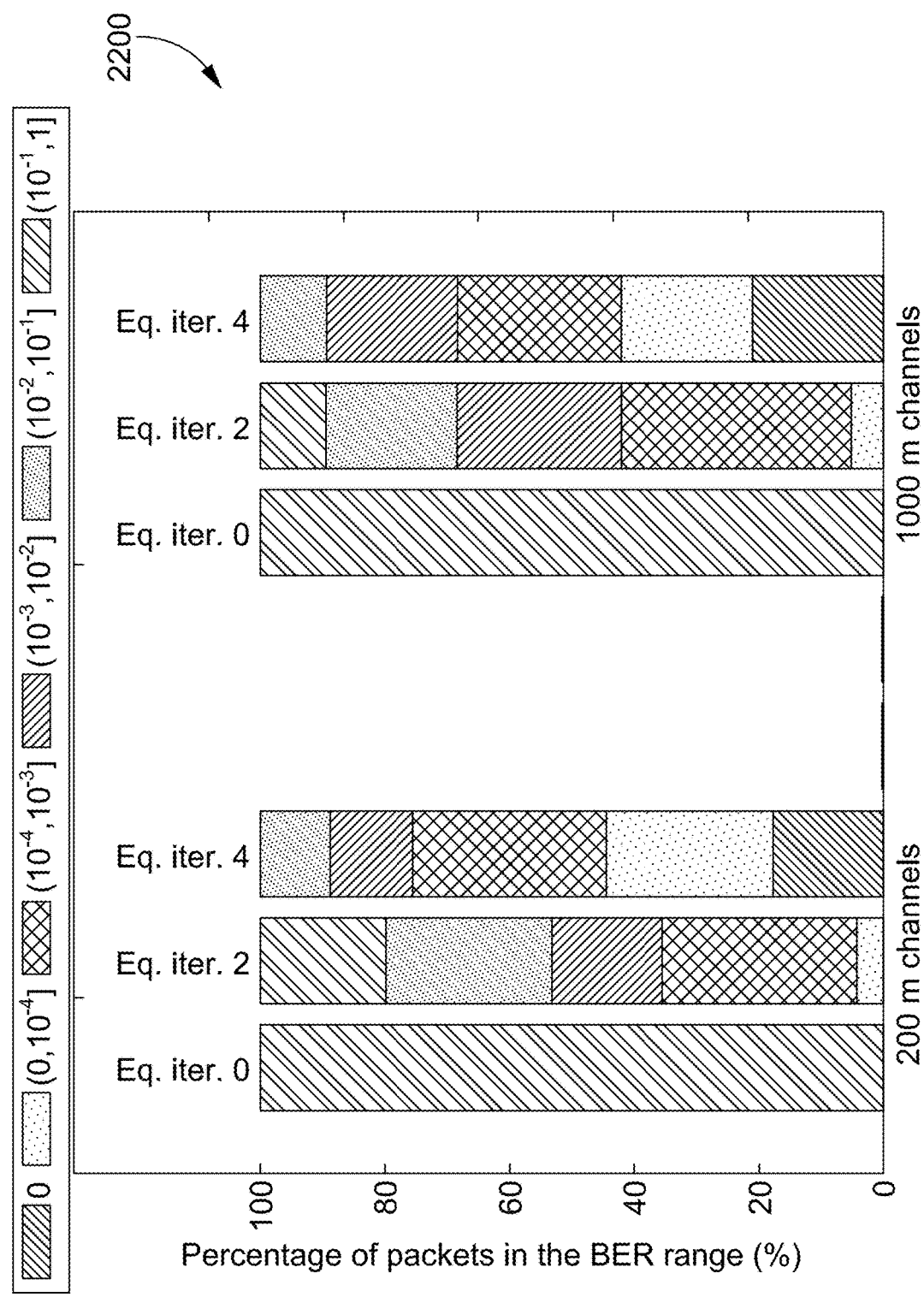
FIG. 22 depicts plots of performance evolution of the NLMS-based SD-ATEQ obtained from a test of aspects hereof.

In FIG. 22, the performance evolution of the NLMS-based SD-ATEQ with different numbers of equalizer iterations is shown for the 8PSK packets, where the number of turbo iterations has been fixed as 3. As is observed from FIG. 19, the detection fails (i.e., the BERs of all the packets are above $10^{-1}$) when the equalizer iteration is zero. The performance continues to increase with each increase in the number of equalizer iterations.

Figure 23:
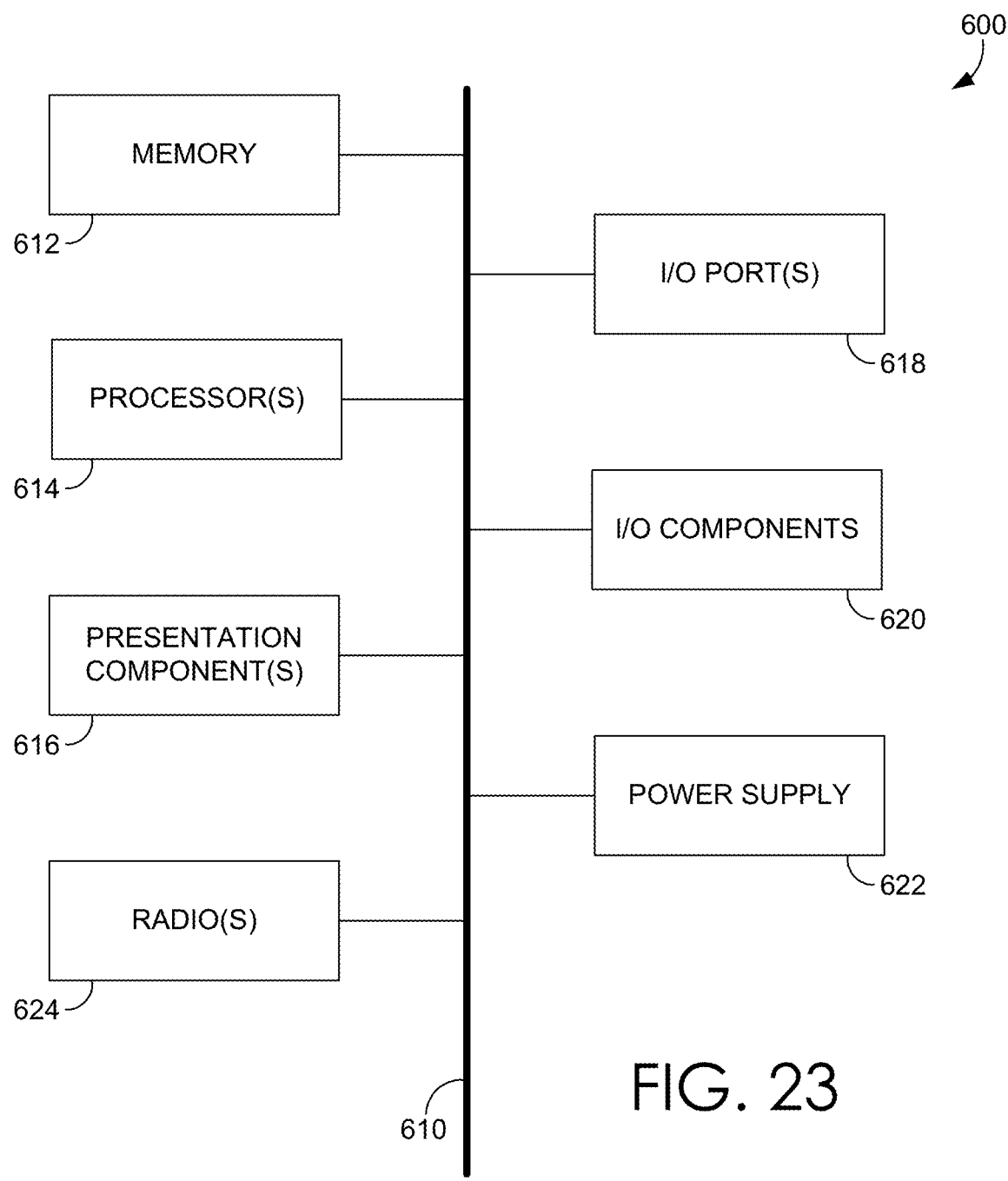
FIG. 23 is a block diagram illustrating an exemplary computing device that may be used with systems and methods in accordance with aspects hereof.

The technology herein described may comprise, among other things, a MIMO UWA modem, a single carrier system with bit-interleaved coded modulation for point-to-point MIMO UWA transmissions, and a method or a set of instructions stored on one or more computer-readable media. Information stored on the computer-readable media may be used to direct operations of a computing device, and an exemplary computing device 600 is depicted in FIG. 23. The computing device 600 is but one example of a suitable computing system and is not intended to suggest any limitation as to the scope of use or functionality of inventive aspects hereof. Neither should the computing system 600 be interpreted as having any dependency or requirement relating to any one or combination of components illustrated. Moreover, aspects of the invention may also be practiced in distributed computing systems where tasks are performed by separate or remote-processing devices that are linked through a communications network.

The computing device 600 has a bus 610 that directly or indirectly couples the following components: memory 612 (which may include memory chips or other local memory structures), one or more processors 614 (which may include a programmable logic controller), one or more presentation components 616, input/output (I/O) ports 618, I/O components 620, and an illustrative power supply 622. The bus 610 represents what may be one or more busses (such as an address bus, data bus, or combination thereof). Although the various blocks of FIG. 23 are shown with lines for the sake of clarity, in reality, delineating various components is not so clear, and metaphorically, the lines would more accurately be grey and fuzzy. For example, processors may have memory. Further, it will be understood by those of ordinary skill in the art that not all computing devices contemplated for use with aspects hereof may utilize all components illustrated.

The computing device 600 typically includes a variety of computer-readable media. Computer-readable media can be any available media that can be accessed by the computing system 600 and includes both volatile and nonvolatile media, removable and non-removable media. By way of example, and not limitation, computer-readable media may comprise computer storage media and communication media; computer storage media excluding signals per se. Computer storage media includes volatile and nonvolatile, removable and non-removable media implemented in any method or technology for storage of information such as computer-readable instructions, data structures, program modules or other data.

Computer storage media includes, by way of example, and not limitation, Random Access Memory (RAM); Read Only Memory (ROM); Electronically Erasable Programmable Read Only Memory (EEPROM); flash memory or other memory technologies; CD-ROM, digital versatile disks (DVD) or other optical or holographic media; magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of communications media.

The computing device 600 is depicted to have one or more processors 614 that read data from various entities such as memory 612 or I/O components 620. Exemplary data that is read by a processor may be comprised of computer code or machine-useable instructions, which may be computer-executable instructions such as program modules, being executed by a computer or other machine. Generally, program modules such as routines, programs, objects, components, data structures, etc., refer to code that perform particular tasks or implement particular abstract data types.

The presentation components 616 present data indications to a user or other device. Exemplary presentation components are a display device, speaker, printing component, light-emitting component, etc. The I/O ports 618 allow the computing device 600 to be logically coupled to other devices including the I/O components 620, some of which may be built in.

In the context of MIMO UWA communications, a computing device 600 may be used to process the received signals and compute the algorithms associated with the turbo receivers. For example, a computing device may be used to perform the iterative method of equalizer adaptation and decoding of MIMO UWA communications described herein.

Some aspects of this disclosure have been described with respect to the illustrative examples provided by FIGS. 1-23. Additional aspects of the disclosure will now be described that may related subject matter included in one or more claims of this application, or one or more related applications, but the claims are not limited to only the subject matter described in the below portions of this description. These additional aspects may include features illustrated by FIGS. 1-23, features not illustrated by FIGS. 1-23, and any combination thereof. When describing these additional aspects, reference may or may not be made to elements depicted by FIGS. 1-23.

One aspect disclosed herein is directed to a method for underwater communication using a multiple-input multiple-output ("MIMO") acoustic channel. The method may comprise receiving at an acoustic receiver a signal. The signal may comprise bits of information encoded in one or more transmitted symbols. The acoustic receiver may include an adaptive turbo equalizer and a MAP decoder. Such method also may comprise for each of the one or more transmitted symbols, after a two-layer iterative process is completed outputting from the MAP decoder a hard decision of the bits of information encoded in each of the one or more transmitted symbols. The two-layer iterative process may include both an iterative exchange of information between the adaptive turbo equalizer and the MAP decoder (a "Turbo Iteration") and an iterative adaptation of both a feedforward filter and a serial interference cancellation filter of the adaptive turbo equalizer based upon a posteriori soft decisions of a respective block of the one or more transmitted symbols (a "Equalizer Iteration"). Each Turbo Iteration may comprise equalizing the received signal with the adaptive turbo equalizer to estimate each symbol within the respective block of the one or more transmitted symbols, sending each estimated symbol to the MAP decoder, generating, with the MAP decoder, a soft decision of the transmitted bits of information encoded in each said estimated symbol using a bit a priori log likelihood ratio, and sending the bit a priori log likelihood ratio to the adaptive turbo equalizer for use with a subsequent Turbo Iteration. Each Equalizer Iteration may comprise, based upon a first estimated symbol determined by the adaptive turbo equalizer during a first Turbo Iteration, determining an a posteriori soft decision of the symbol, based upon a second estimated symbol determined by the equalizer during a second Turbo Iteration and based upon the a posteriori soft decision, determining an apparent error in the equalizer filters, and adjusting the equalizer filters based upon the apparent error.

The signal received by the acoustic receiver may comprise the sum of multiple data streams transmitted by multiple transducers. The acoustic receiver may include a plurality of streams for equalizing and decoding a MIMO transmission, wherein each stream of the plurality of streams includes a respective adaptive turbo equalizer and a respective MAP decoder. Each stream of the plurality of streams may include a respective soft demapper for determining the bit a priori log likelihood ratio from each estimated symbol.

One of a QPSK, a 8PSK, a 16QAM or a higher order QAM may be used in the modulated MIMO transmission. The training overhead for different modulation schemes may be dependent on channel characteristics, performance requirements, and received signal-to-noise ratio. The signal received by the acoustic receiver may comprise both training blocks and information blocks. The training blocks may include training symbols used to initialize the acoustic receiver. The information blocks may include the bits of information encoded in the one or more transmitted symbols.

In some aspects, each Equalizer Iteration may use a normalized least mean square algorithm. The equalizer vector of both the feedforward filter and the serial interference cancellation filter may be updated using equation (21), set forth above. In other aspects, each Equalizer Iteration may use an improved proportionate normalized least mean square algorithm. The equalizer vector of both the feedforward filter and the serial interference cancellation filter may be updated using equation (23), set forth above.

The two-layer iterative process is completed when the feedforward filter and the serial interference cancellation filter converge, in accordance with some aspects. In other aspects, the two-layer iterative process is completed after at least five Turbo Iterations have been completed.

Another aspect disclosed herein is directed to an improved MIMO UWA modem. The improved MIMO UWA modem may comprise an acoustic receiver having a plurality of acoustic sensors configured to receive MIMO UWA transmissions, a memory, and a signal processing unit in communication with the acoustic receiver. The signal processing unit may be configured to decode the MIMO UWA transmissions and output a hard decision of what bit of information is encoded on one or more symbols included in the MIMO UWA transmissions. The signal processing unit may include a plurality of streams for decoding the MIMO UWA transmissions. Each stream of the plurality of streams may include a MAP decoder and an adaptive turbo equalizer having a feedforward filter and a serial interference cancellation filter. The signal processing unit may decode the MIMO UWA transmissions by iteratively exchanging soft decisions of the one or more symbols between the adaptive turbo equalizer and the MAP decoder and by iteratively adapting the feedforward filter and the serial interference cancellation filter based upon a posteriori soft decisions of the one or more symbols.

The adaptive turbo equalizer of each stream may further comprise an a posteriori statistical calculation unit for determining the a posteriori soft decisions of the one or more symbols. The a posteriori statistical calculation unit may include a time averaging statistical estimator that determines a mean of the soft symbols and a variance of the soft symbols for use in determining the a posteriori soft decisions of the one or more symbols. The time averaging statistical estimator may determine the mean of the soft symbols using equation (18), set forth above. The time averaging statistical estimator may determine the variance of the soft symbols using equation (19), set forth above. The a posteriori statistical calculation unit may determine the a posteriori soft decisions of each symbol of the one or more symbols using equation (15), set forth above. Each stream of the plurality of streams may include a respective soft demapper for determining a bit a priori log likelihood ratio from each estimated symbol. The MIMO UWA transmissions received by the acoustic receiver may comprise one of a QPSK modulated MIMO transmission, an 8PSK modulated MIMO transmission, a 16QAM modulated MIMO transmission, or a higher order QAM modulated MIMO transmission.

The foregoing description has described the systems and methods of the present invention in terms of MIMO UWA communications for the purposes of concision. It would be understood by artisans skilled in the relevant art, however, that the above described systems and methods may also be used for single-input multiple-output ("SIMO") UWA communications and single-input single-output ("SISO") UWA communications.

From the foregoing, it will be seen that aspects described herein are well adapted to attain all of the ends and objects hereinabove set forth, together with other advantages which are obvious and which are inherent to the structure. It will be understood that certain features and subcombinations are of utility and may be employed without reference to other features and subcombinations. This is contemplated by and is within the scope of the claims. Since many possible aspects described herein may be made without departing from the scope thereof, it is to be understood that all matter herein set forth or shown in the accompanying drawings is to be interpreted as illustrative and not in a limiting sense.

What is claimed is:

1. A MIMO UWA modem comprising:
   an acoustic receiver comprising a plurality of acoustic sensors configured to receive MIMO UWA transmissions;
   a memory;
   a signal processing unit in communication with the acoustic receiver, the signal processing unit configured to decode the MIMO UWA transmissions and output a hard decision of what bit of information is encoded on one or more symbols included in the MIMO UWA transmissions,
   wherein the signal processing unit includes a plurality of streams for decoding the MIMO UWA transmissions, each stream of the plurality of streams includes a maximum a posteriori probability decoder and an adaptive turbo equalizer having a feedforward filter and a serial interference cancellation filter,
   wherein the signal processing unit decodes the MIMO UWA transmissions by iteratively exchanging soft decisions of the one or more symbols between the adaptive turbo equalizer and the maximum a posteriori probability decoder and by iteratively adapting the feedforward filter and the serial interference cancellation filter based upon a posteriori soft decisions of the one or more symbols.

2. The MIMO UWA modem of claim 1, wherein the adaptive turbo equalizer of each stream further comprises an a posteriori statistical calculation unit for determining the a posteriori soft decisions of the one or more symbols.

3. The MIMO UWA modem of claim 2, wherein the a posteriori statistical calculation unit includes a time averaging statistical estimator that determines a mean and a variance of the soft symbols for use in determining the a posteriori soft decisions of the one or more symbols.

4. The MIMO UWA modem of claim 3, wherein the time averaging statistical estimator determines the mean using the equation $$\mu_n^t = \frac{1}{K_d} \sum_{k=K_p+1}^{K_b} \frac{\hat{x}_{n,k}^t}{Q(\hat{x}_{n,k}^t)}$$

and determines the variance using the equation $$\delta_n^t = \frac{1}{K_d} \sum_{k=K_p+1}^{K_b} \left| \hat{x}_{n,k}^t - \mu_n^t Q(\hat{x}_{n,k}^t) \right|^2.$$

5. The MIMO UWA modem of claim 2, wherein the a posteriori statistical calculation unit determines the a posteriori soft decisions of each symbol of the one or more symbols using the equation $\check{x}_{n,k}^t = \sum_{\alpha_i \in s} \alpha_i P(x_{n,k} = \alpha_i | \check{x}_{n,k}^t)$.

6. The MIMO UWA modem of claim 1, wherein each stream of the plurality of streams includes a respective soft demapper for determining a bit a priori log likelihood ratio from each estimated symbol.

7. The MIMO UWA modem of claim 1, wherein the MIMO UWA transmissions received by the acoustic receiver comprise one of a QPSK modulated MIMO transmission, an 8PSK modulated MIMO transmission, a 16QAM modulated MIMO transmission, or a higher order QAM modulated MIMO transmission.

* * * * *

UNITED STATES PATENT AND TRADEMARK OFFICE
CERTIFICATE OF CORRECTION

PATENT NO. : 10,637,586 B2  
APPLICATION NO. : 15/686390  
DATED : April 28, 2020  
INVENTOR(S) : Yahong Rosa Zheng, Weimin Duan and Chengshan Xiao Page 1 of 1

It is certified that error appears in the above-identified patent and that said Letters Patent is hereby corrected as shown below:

On the Title Page

Column 01, Item (73) Assignee: Please remove "National Science Foundation, Alexandria, VA (US)" and replace with --The Curators of the University of Missouri, Columbia, MO (US)--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*